US 8,339,696 B2

(12) United States Patent
Miyatake et al.

(10) Patent No.: US 8,339,696 B2
(45) Date of Patent: Dec. 25, 2012

(54) OPTICAL SCANNING DEVICE AND IMAGE FORMING APPARATUS

(75) Inventors: Naoki Miyatake, Kanagawa (JP); Yoshinori Hayashi, Kanagawa (JP); Takeshi Ueda, Tokyo (JP); Naoto Watanabe, Kanagawa (JP); Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/029,817

(22) Filed: Feb. 17, 2011

(65) Prior Publication Data

US 2011/0134500 A1    Jun. 9, 2011

Related U.S. Application Data

(62) Division of application No. 12/025,343, filed on Feb. 4, 2008, now Pat. No. 7,924,487.

(30) Foreign Application Priority Data

Feb. 9, 2007   (JP) .................. 2007-029874
Mar. 1, 2007   (JP) .................. 2007-050884

(51) Int. Cl.
*G02B 26/08*   (2006.01)
(52) U.S. Cl. ................. 359/204.1; 359/216.1
(58) Field of Classification Search .... 359/204.1–204.5; 347/233, 238, 243–244, 258–261
See application file for complete search history.

(56) References Cited

U.S. PATENT DOCUMENTS

| 5,606,181 | A | 2/1997 | Sakuma et al. |
| 6,462,853 | B2 | 10/2002 | Hayashi |
| 6,621,512 | B2 | 9/2003 | Nakajima et al. |
| 6,771,300 | B2 | 8/2004 | Amada et al. |
| 6,788,444 | B2 | 9/2004 | Suzuki et al. |
| 6,815,663 | B2 | 11/2004 | Ueda |
| 7,068,296 | B2 | 6/2006 | Hayashi et al. |
| 7,106,483 | B2 | 9/2006 | Hayashi et al. |
| 7,161,724 | B1 | 1/2007 | Miyatake |
| 7,167,288 | B2 | 1/2007 | Miyatake et al. |
| 7,218,432 | B2 | 5/2007 | Ichii et al. |
| 7,253,937 | B2 | 8/2007 | Ueda et al. |

(Continued)

FOREIGN PATENT DOCUMENTS

JP       11-340570       12/1999
(Continued)

OTHER PUBLICATIONS

Office Action issued Jun. 1, 2011, in Japanese Patent Application No. 2007-029874.

(Continued)

*Primary Examiner* — James Phan
(74) *Attorney, Agent, or Firm* — Oblon, Spivak, McClelland, Maier & Neustadt, L.L.P.

(57) ABSTRACT

An optical scanning device includes a coupling optical system, a light source including a plurality of light emitting units for emitting light beams, and a deflector including a deflecting surface for deflecting the light beams. The coupling optical system is arranged on an optical path between the light source and the deflector so that the light beams enter the deflector at an angle with respect to a normal direction of the deflecting surface in a sub-scanning direction. The light emitting units are arranged two-dimensionally, and a distance between two light emitting units at opposite ends in a main scanning direction is smaller than a distance between two light emitting units at opposite ends in the sub-scanning direction.

7 Claims, 23 Drawing Sheets

U.S. PATENT DOCUMENTS

| | | |
|---|---|---|
| 7,271,823 B2 | 9/2007 | Izumi et al. |
| 7,271,824 B2 | 9/2007 | Omori et al. |
| 7,271,942 B2 * | 9/2007 | Tomioka .................... 359/204.4 |
| 7,277,212 B2 | 10/2007 | Miyatake et al. |
| 7,397,591 B2 | 7/2008 | Hayashi et al. |
| 7,545,547 B2 | 6/2009 | Hayashi et al. |
| 7,969,634 B2 * | 6/2011 | Watanabe et al. .......... 359/204.1 |
| 2005/0179771 A1 | 8/2005 | Ueda |
| 2006/0077500 A1 | 4/2006 | Hayashi et al. |
| 2006/0203264 A1 | 9/2006 | Miyatake |
| 2006/0209373 A1 * | 9/2006 | Kato ............................ 359/204 |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2007/0030538 A1 | 2/2007 | Hirakawa et al. |
| 2007/0058255 A1 | 3/2007 | Imai et al. |
| 2007/0081213 A1 * | 4/2007 | Tanimura et al. ............. 359/204 |
| 2007/0211324 A1 | 9/2007 | Sakai et al. |
| 2007/0211325 A1 | 9/2007 | Ichii |
| 2007/0215800 A1 | 9/2007 | Miyatake et al. |
| 2007/0216754 A1 | 9/2007 | Miyatake |
| 2007/0253047 A1 | 11/2007 | Ichii et al. |
| 2007/0253048 A1 | 11/2007 | Sakai et al. |
| 2007/0297036 A1 | 12/2007 | Nakamura et al. |
| 2008/0123159 A1 | 5/2008 | Hayashi et al. |
| 2008/0180772 A1 | 7/2008 | Miyatake et al. |
| 2008/0204840 A1 | 8/2008 | Watanabe et al. |
| 2008/0219601 A1 | 9/2008 | Arai et al. |

FOREIGN PATENT DOCUMENTS

| | | |
|---|---|---|
| JP | 11-354888 | 12/1999 |
| JP | 3227226 | 8/2001 |
| JP | 2003-5114 | 1/2003 |
| JP | 2003-270577 | 9/2003 |
| JP | 2004-287292 | 10/2004 |
| JP | 2005-10268 | 1/2005 |
| JP | 2005-153283 | 6/2005 |
| JP | 2005-250319 | 9/2005 |
| JP | 2006-88569 | 4/2006 |
| JP | 2006-133637 | 5/2006 |
| JP | 2006-258918 | 9/2006 |
| JP | 2006-284822 | 10/2006 |
| JP | 2006-292891 | 10/2006 |
| JP | 2006-350167 | 12/2006 |
| JP | 2007-10868 | 1/2007 |
| JP | 2007-183354 | 7/2007 |
| JP | 2008-185959 | 8/2008 |
| JP | 2008-197187 | 8/2008 |

OTHER PUBLICATIONS

Office Action issued Jun. 8, 2011, in Japan Patent Application No. 2007-050884.

Office Action issued Jan. 26, 2012, in Japanese Patent Application No. 2007-029874.

\* cited by examiner

FIG. 14

| | | | 850 nm (Ref.) |
|---|---|---|---|
| WAVELENGTH RANGE | | 780 nm | |
| MATERIAL SYSTEM OF SPACER LAYER/QUANTUM WELL LAYER | | AlGaAs/AlGaAs | AlGaInP/GaInPAs | AlGaAs/GaAs |
| SPACER LAYER | | $Al_{0.6}Ga_{0.4}As$ (Eg=2.0226 eV) | $(Al_xGa_{1-x})_{0.5}In_{0.5}P$ (Eg(x=0.7)=2.324 eV) | $Al_{0.6}Ga_{0.4}As$ (Eg=2.0226 eV) |
| ACTIVE LAYER | QUANTUM WELL LAYER | $Al_{0.12}Ga_{0.88}As$ (Eg=1.5567 eV) | GaInPAs (COMPRESSIVE STRAIN) (Eg=1.5567 eV) | GaAs (Eg=1.42 eV) |
| | BARRIER LAYER | $Al_{0.3}Ga_{0.7}As$ (Eg=1.78552 eV) | $Ga_xIn_{1-x}P$ (TENSILE STRAIN) (Eg(x=0.6)=2.02 eV) | $Al_{0.3}Ga_{0.7}As$ (Eg=1.78552 eV) |
| Eg DIFFERENCE BETWEEN SPACER LAYER AND QUANTUM WELL LAYER (ΔEg) | | 465.9 meV | 767.3 meV | 602.6 meV |
| Eg DIFFERENCE BETWEEN BARRIER LAYER AND QUANTUM WELL LAYER (ΔEg) | | 228.8 meV | 463.3 meV | 365.5 meV |

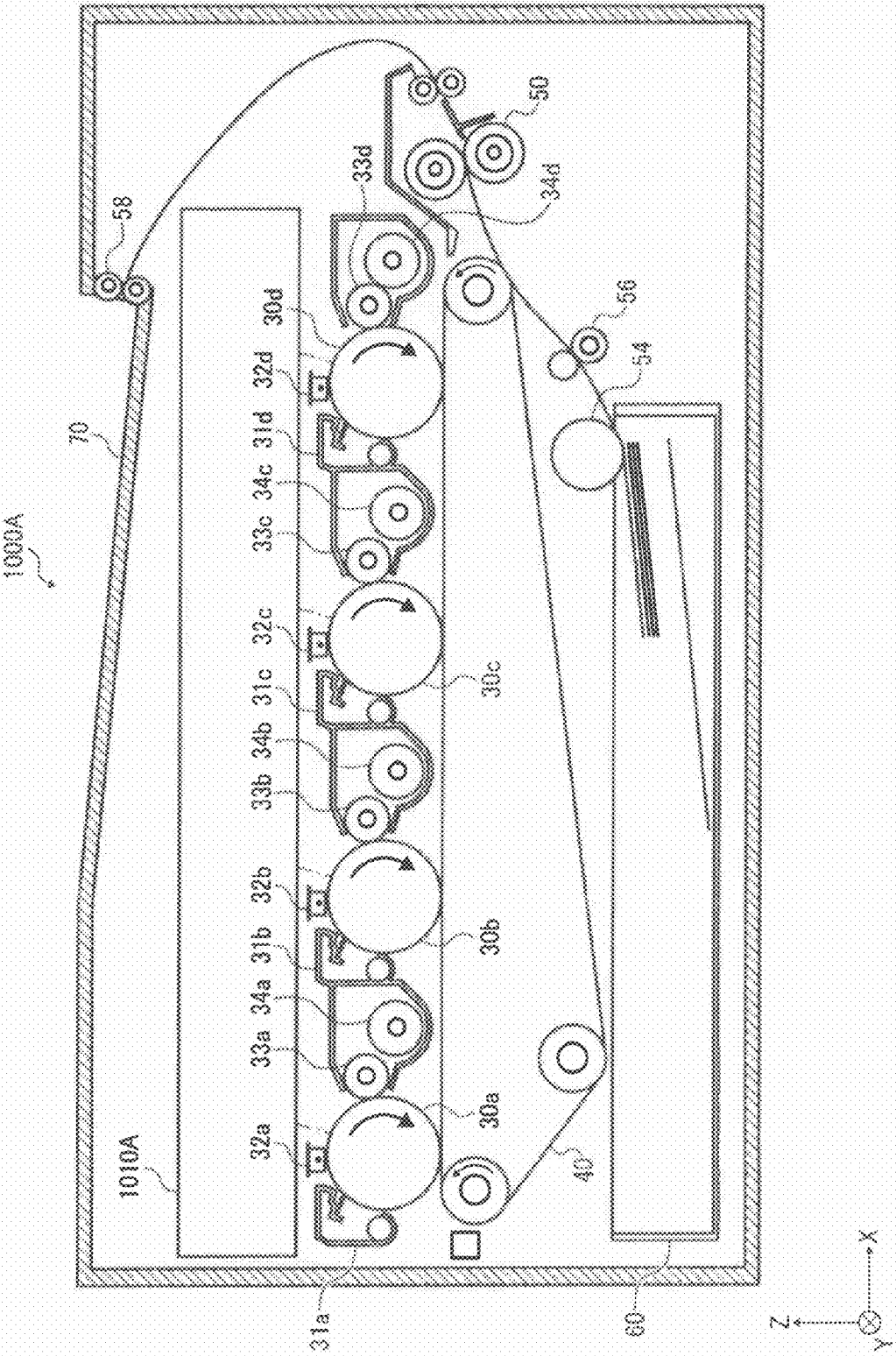

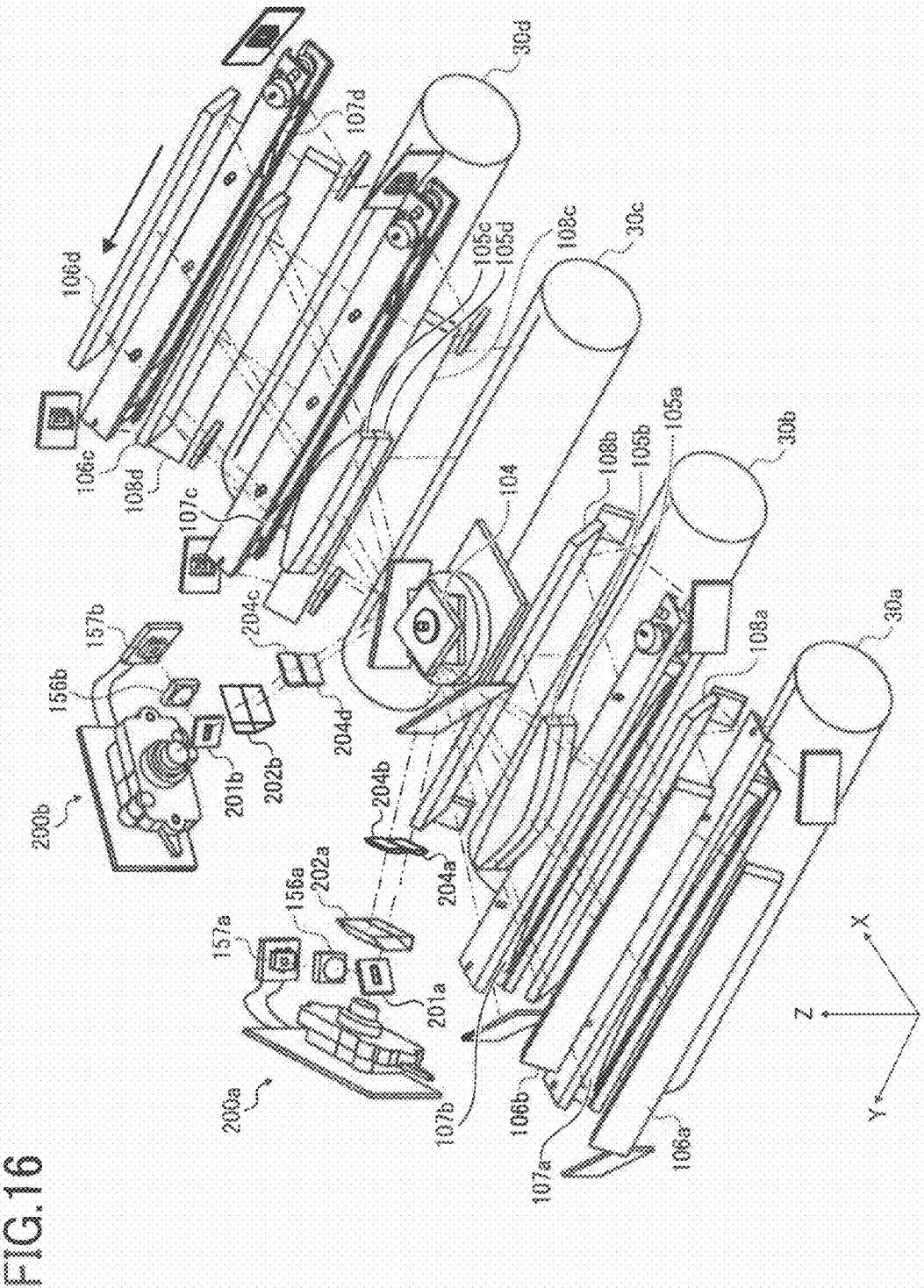

OPTICAL SCANNING DEVICE AND IMAGE FORMING APPARATUS

CROSS-REFERENCE TO RELATED APPLICATIONS

The present application is a divisional application of U.S. Ser. No. 12/025,343, filed Feb. 4, 2008, now U.S. Pat. No. 7,924,487, which claims priority to Japanese priority document 2007-029874, filed in Japan on Feb. 9, 2007, and 2007-050884, filed in Japan on Mar. 1, 2007, the entire contents of each of which are incorporated herein by reference in their entirety.

BACKGROUND OF THE INVENTION

1. Field of the Invention

The present invention relates to an optical scanning device and an image forming apparatus.

2. Description of the Related Art

Laser image forming apparatuses have been widely used for electrophotographic image recording. Such an image forming apparatus includes an optical scanning device, and a method of rotating a drum to form a latent image, while scanning laser beams, using a polygon scanner (for example, a polygon mirror) in an axial direction of the drum having photosensitivity has been generally used. In the field of electrophotography, image forming apparatuses are required to form an image with high write density at a high speed to improve image quality and operability.

As one method of realizing both high density and high speed, it can be considered to rotate a polygon scanner at a high speed. In this method, however, noise and vibration in the polygon scanner increase, power consumption also increases, and durability is deteriorated.

As another method of realizing both high density and high speed, it can be considered to use multi beams of light emitted from a light source.

As one example of a multi-beam lighting system, a lighting system in which a plurality of semiconductor lasers and coupling lenses provided in a pair with each semiconductor laser are arranged in a main scanning direction, and these are integrally supported has been proposed. This lighting system can decrease the size of a deflection-reflecting surface by crossing light beams in the main scanning direction near the deflection-reflecting surface of a deflector that deflects the beams from semiconductor lasers, and can reduce a difference in optical performance between the beams, because the beams after being deflected can be made to pass through substantially the same optical path of an imaging optical system. Such a multi-beam lighting system is also referred to as a "crossing multi-beam light source". Accordingly, because a cheap semiconductor laser is used, and fewer components are used, a very cheap multi-beam lighting system and optical scanning device can be provided.

For example, Japanese Patent Application Laid-open No. H11-340570 discloses a photoelectric converter, which includes on the same substrate a plurality of photoelectric conversion units including a plurality of laminated semiconductor layers and having a side at an end in a direction perpendicular to the lamination direction.

Japanese Patent Application Laid-open No. H11-354888 discloses a semiconductor light emitting diode including an arrangement substrate, one substrate supported by the arrangement substrate, a plurality of light emitting units each including a plurality of semiconductor layers formed by being laminated on the side of the substrate opposite the arrangement substrate, a plurality of ohmic electrodes provided on the side of the light emitting units opposite the substrate and electrically connected in one-to-one correspondence with each light emitting unit, and at least one heat release layer formed on the side of respective light emitting units opposite the substrate by being laminated on the substrate via the light emitting units.

However, to use the photoelectric converter disclosed in Japanese Patent Application Laid-open No. H11-340570 and the semiconductor light emitting diode disclosed Japanese Patent Application Laid-open No. H11-354888 for the multi-beam light source, the power consumption is large and a heat output is large. Therefore, the upper limit of the number of beams is about four beams or eight beams in view of the cost. Further, because each element has one-dimensional arrangement of the light emitting units, if the number of beams is considerably increased, a deviation amount of the beams from an optical axis of an optical system increases, and beam characteristic can be deteriorated.

Therefore, a vertical cavity surface emitting laser (VCSEL) has been proposed, in which a plurality of light emitting points can be easily formed on one element two-dimensionally, and the power consumption is small.

Japanese Patent No. 3227226 discloses an image forming apparatus, which uses an optical scanning device including a light source that emits independently modulatable three or more laser beams from a light emitting unit arranged two-dimensionally, a laser beam deflector that periodically deflects the laser beams in respective directions, and a scanning optical system that images the laser beams on a surface to be scanned. In the optical scanning device, if it is assumed that the number of the laser beams is n, number of imaging spots formed on an image carrier are S1 to Sn from the top in a direction perpendicular to a scanning direction, and a distance from the imaging spot S1 to the imaging spots S2 to Sn respectively measured at right angles to the scanning direction is L2 to Ln, values D2 to Dn respectively obtained by dividing L2 to Ln by a scanning line pitch p are approximately integral numbers, and surpluses M2 to Mn as a result of dividing D2 to Dn by n are natural numbers less than n, which are different from each other.

Japanese Patent Application Laid-open No. 2004-287292 discloses an optical scanning device having a first substrate fitted to a housing fixed to an image forming apparatus body, on which a light emitting diode and a driving circuit therefor are mounted, a second substrate fitted to the housing away from the first substrate, on which a connector for connecting a harness from the image forming apparatus body is mounted, and an elastically deformable connection member that electrically connects a first substrate terminal with a second substrate terminal.

Japanese Patent Application Laid-open No. 2005-250319 discloses a lighting system formed by combining a plurality of sets of a light source in which a plurality of independently modulatable light emitting points are arranged two-dimensionally and a coupling lens that couples divergent beams emitted from the light source, an optical scanning device with the lighting system, and an image forming apparatus with the optical scanning device.

Generally, in the optical scanning device, to suppress occurrence of density unevenness on an image due to a change in a quantity of light with temperature fluctuation and change with lapse of time, auto power control (APC) is executed, by which the quantity of light emitted from the light source is monitored by a detector such as a photodiode, and an output level is controlled based on the result. In this case, with an edge emitting laser, the beams are emitted in two directions forward and backward. Therefore, if the beam emitted forward is used for scanning and the beam emitted backward is used for monitoring, even if the beam for scanning is returned to the light source, there is little influence on the monitoring result. However, with the VCSEL, because the beams are emitted only in one direction, the emitted beams need to be divided or diverged, to use one for scanning and the other for monitoring. In this case, return light to the light source can affect the monitoring result.

Recently, an optical scanning device using an overfilled optical system has been proposed, in which a width of a deflector surface of a deflector that deflects a plurality of light beams is smaller than an irradiation range of a plurality of light beams. Such an optical scanning device is disclosed in, for example, Japanese Patent Application Laid-open No. 2003-270577. By the overfilled optical system, the width of the deflector surface can be reduced, and therefore more deflector surfaces can be provided than in the conventional deflector having the same diameter (diameter of a circle centering on a rotation axis, with which the deflector touches internally). Therefore, the scanning speed can be improved without increasing the number of revolution of the deflector.

In the optical scanning device using the overfilled optical system, however, there is a problem in that light quantity distribution of the light beams reflected by the deflector surfaces is not uniform. Further, in the VCSEL arrays, because a divergence angle of the light beam is small, the light quantity distribution of the light beams incident to the deflector surfaces is slightly non-uniform as compared with that of the edge emitting laser. Therefore, to combine the vertical-cavity surface emitting type light source with the overfilled optical system, a technique for equalizing the light quantity distribution of the light beams is required.

SUMMARY OF THE INVENTION

It is an object of the present invention to at least partially solve the problems in the conventional technology.

According to an aspect of the present invention, there is provided an optical scanning device. The optical scanning device includes a light source that includes a plurality of light emitting units for emitting light beams; a deflector that includes a deflecting surface for deflecting the light beams from the light source; a scanning optical system that focuses the light beams deflected by the deflector on a surface to be scanned; and a monitoring optical system that monitors a quantity of light beams emitted from the light source. The light beams enter the deflector from a direction inclined with respect to a normal direction of the deflecting surface at least in a sub-scanning direction. The light emitting units are arranged two-dimensionally, and a distance between two light emitting units at opposite ends in a main scanning direction is smaller than a distance between two light emitting units at opposite ends in the sub-scanning direction.

According to another aspect of the present invention, there is provided an optical scanning device that is configured to scan a plurality of to-be-scanned surfaces with light beams. The optical scanning device includes a light source that includes a plurality of light emitting units for emitting light beams; a deflector that includes a deflecting surface for deflecting the light beams from the light source; a plurality of scanning optical systems that each correspond to one of the to-be-scanned surfaces and focus the light beams deflected by the deflector on corresponding one of the to-be-scanned surfaces; and a monitoring optical system that monitors a quantity of light beams emitted from the light source. The light beams enter the deflector from a direction inclined with respect to a normal direction of the deflecting surface at least in a sub-scanning direction. The light emitting units are arranged two-dimensionally, and a distance between two light emitting units at opposite ends in a main scanning direction is smaller than a distance between two light emitting units at opposite ends in the sub-scanning direction.

According to still another aspect of the present invention, there is provided an image forming apparatus that includes an image carrier and an optical scanning device that scans a surface of the image carrier with light beams based on image data. The optical scanning device includes a light source that includes a plurality of light emitting units for emitting light beams; a deflector that includes a deflecting surface for deflecting the light beams from the light source; a scanning optical system that focuses the light beams deflected by the deflector on a surface to be scanned; and a monitoring optical system that monitors a quantity of light beams emitted from the light source. The light beams enter the deflector from a direction inclined with respect to a normal direction of the deflecting surface at least in a sub-scanning direction. The light emitting units are arranged two-dimensionally, and a distance between two light emitting units at opposite ends in a main scanning direction is smaller than a distance between two light emitting units at opposite ends in the sub-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a table of characteristics of the VCSEL shown in FIG. 12;

FIG. 15 is a schematic diagram of an image forming apparatus according to a modification of the first embodiment;

FIG. 16 is a schematic diagram of an optical scanning device shown in FIG. 15;

DETAILED DESCRIPTION OF THE PREFERRED EMBODIMENTS

Exemplary embodiments of the present invention are explained in detail below with reference to the accompanying drawings.

Figure 1:
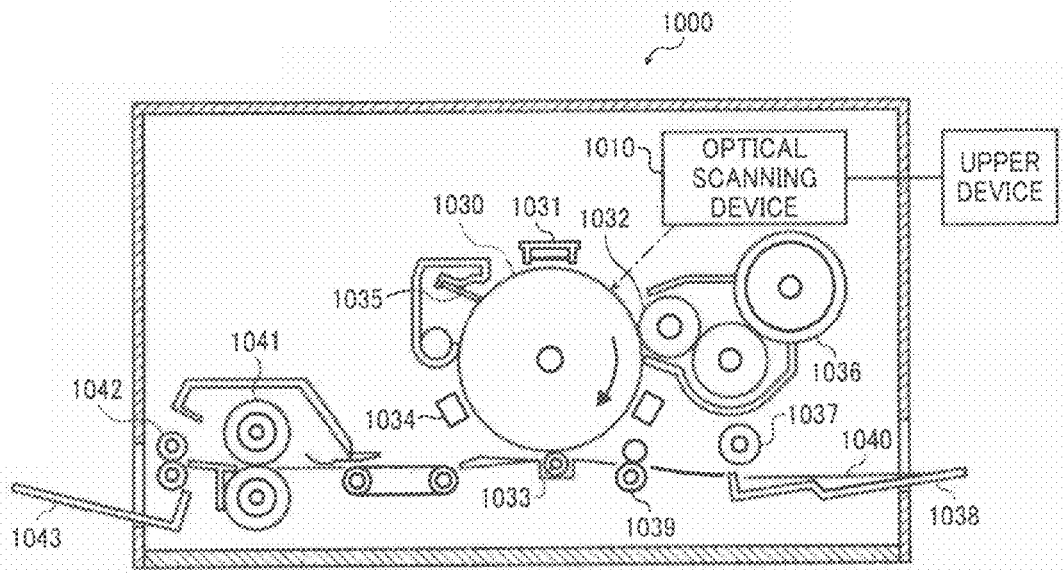
FIG. 1 is a schematic diagram of an image forming apparatus according to a first embodiment of the present invention.

A first embodiment of the present invention is explained below with reference to FIGS. 1 to 9. FIG. 1 is a schematic diagram of a printer 1000 as an image forming apparatus according to the first embodiment.

The printer 1000 includes an optical scanning device 1010, a photosensitive drum 1030, a charger 1031, a developing roller 1032, a transfer charger 1033, a discharge unit 1034, a cleaning blade 1035, a toner cartridge 1036, a feed roller 1037, a feed tray 1038, a pair of registration rollers 1039, a fuser roller 1041, an eject roller 1042, and an eject tray 1043.

The photosensitive drum 1030 has a photoconductor layer on its surface to be scanned. The photosensitive drum 1030 rotates clockwise (direction of arrow) in FIG. 1.

The charger 1031, the developing roller 1032, the transfer charger 1033, the discharge unit 1034, and the cleaning blade 1035 are arranged near the surface of the photosensitive drum 1030. The charger 1031, the developing roller 1032, the transfer charger 1033, the discharge unit 1034, and the cleaning blade 1035 are arranged in this order in a rotation direction of the photosensitive drum 1030.

The charger 1031 uniformly charges the surface of the photosensitive drum 1030.

The optical scanning device 1010 irradiates light modulated based on image information from a host apparatus (for example, a personal computer) onto the surface of the photosensitive drum 1030 charged by the charger 1031 to form a latent image corresponding to the image information thereon. The latent image is moved toward the developing roller 1032 with the rotation of the photosensitive drum 1030.

The developing roller 1032 allows toner supplied from the toner cartridge 1036 to adhere to the latent image formed on the surface of the photosensitive drum 1030 to obtain a toner image. The toner image is moved toward the transfer charger 1033 with the rotation of the photosensitive drum 1030.

A recording medium (sheet) 1040 is stored in the feed tray 1038. The feed roller 1037 is arranged near the feed tray 1038, and takes out the sheet 1040 one by one from the feed tray 1038 and carries it to the registration rollers 1039. The registration rollers 1039 is arranged near the transfer roller 911, to temporarily hold the sheet 1040 taken out from the feed roller 1037, and also sends off the sheet 1040 toward a space between the photosensitive drum 1030 and the transfer charger 1033, matched with the rotation of the photosensitive drum 1030.

To electrically attract the toner on the surface of the photosensitive drum 1030 to the sheet 1040, a voltage of a reverse polarity to that of the toner is applied to the transfer charger 1033. The toner image on the surface of the photosensitive drum 1030 is transferred onto the sheet 1040 by the voltage. The sheet 1040 having the transferred toner image is carried to the fuser roller 1041.

Heat and pressure are applied to the sheet 1040 by the fuser roller 1041, thereby fixing the toner on the sheet 1040. The sheet 1040 with the toner being fixed is carried to the eject tray 1043 via the eject roller 1042 and sequentially stacked on the eject tray.

The discharge unit 1034 discharges the surface of the photosensitive drum 1030.

The cleaning blade 1035 removes the toner remained on the surface of the photosensitive drum 1030 (residual toner). The removed residual toner is reused. The surface of the photosensitive drum 1030, from which the residual toner has been removed, returns to the position of the charger 1031 again.

Figure 2:
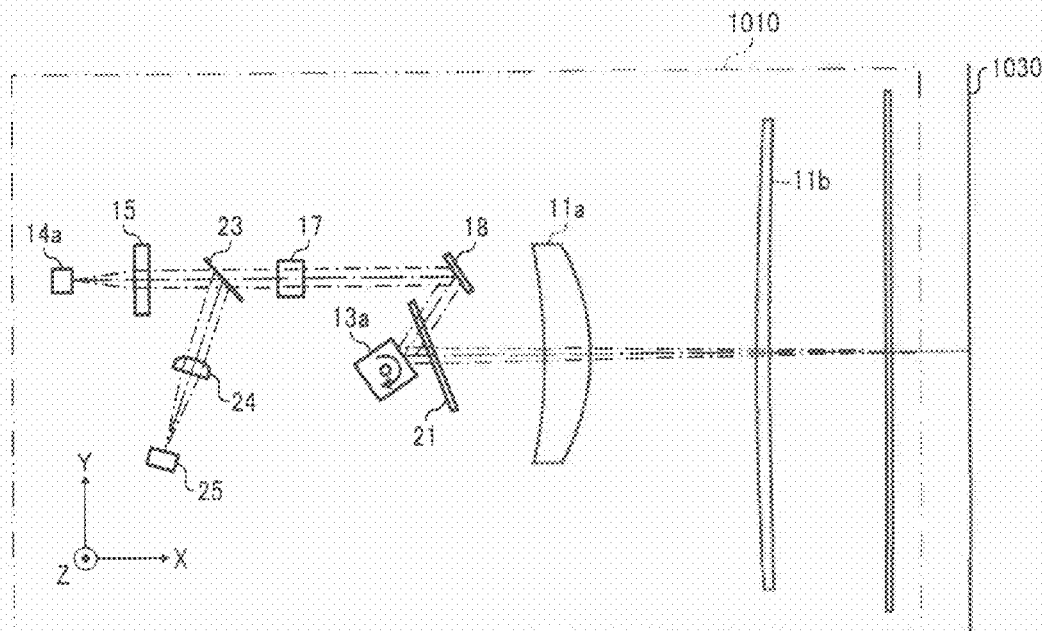
FIG. 2 is a schematic diagram of an example of an optical scanning device shown in FIG. 1.

The configuration of the optical scanning device 1010 is explained with reference to FIG. 2. The optical scanning device 1010 includes a light source 14a, a coupling lens 15, an aperture plate 23, a cylindrical lens 17, a reflecting mirror 18, a polygon mirror 13a, a deflector-side scanning lens 11a, an image-surface side scanning lens 11b, an imaging lens 24, and a photodiode 25. The main scanning direction corresponds to Y-axis direction, the sub-scanning direction corresponds to Z-axis direction, and a direction perpendicular to these scanning directions corresponds to X-axis direction.

Figure 3:
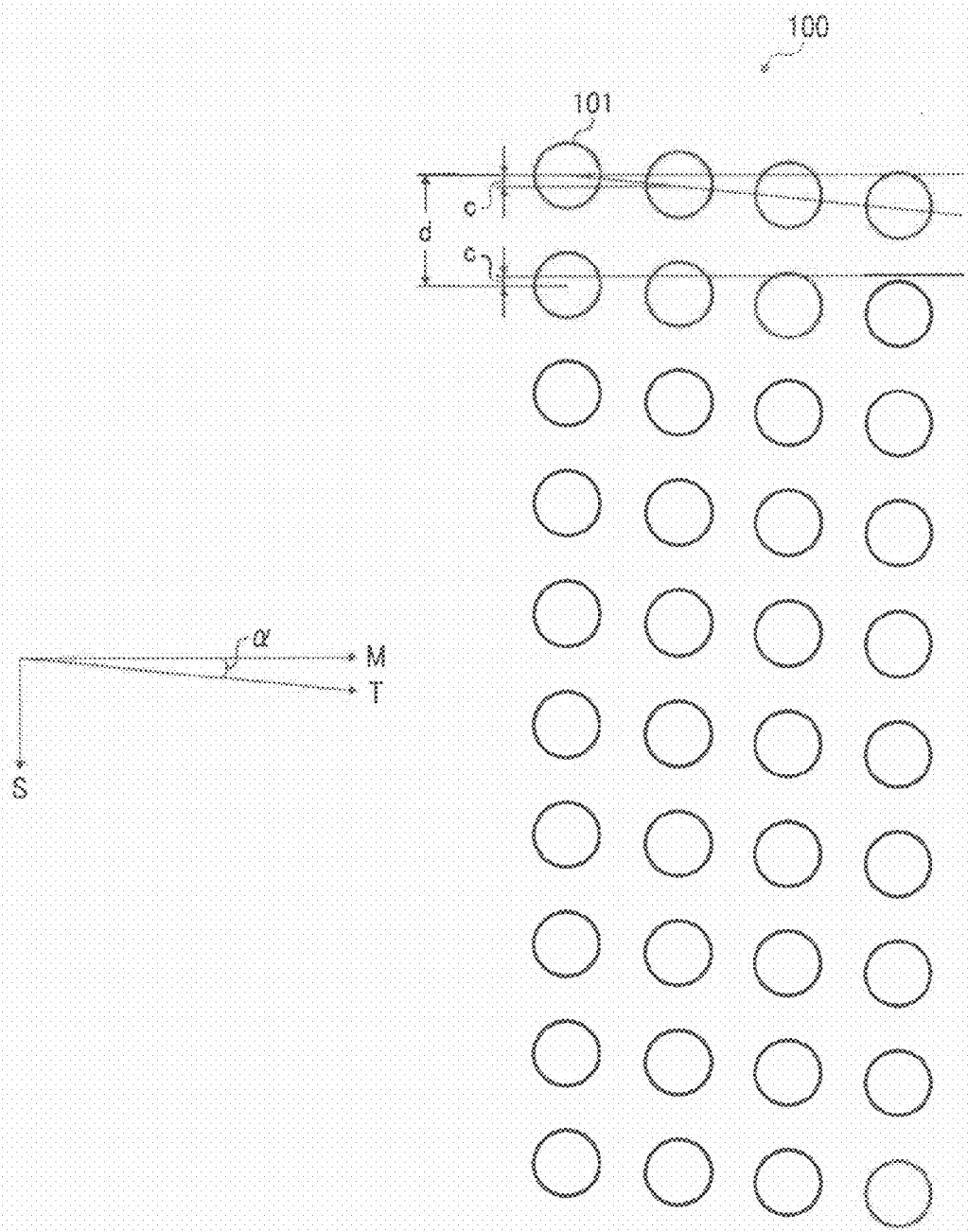
FIG. 3 is a schematic diagram of a two-dimensional array of VCSELs in a light source shown in FIG. 2.

The light source 14a includes, as shown in FIG. 3, a two-dimensional array 100 in which, for example, 40 light emitting units 101 are formed on one substrate. The two-dimensional array 100 includes ten light emitting lines, in which four light emitting units are arranged with an equal interval along a direction forming an angle α of inclination (hereinafter, "T direction") from a direction corresponding to the main scanning direction (hereinafter, "M direction") toward a direction corresponding to the sub-scanning direction (hereinafter, "S direction"). The ten light emitting lines are arranged in the S direction with an equal interval. That is, 40 light emitting units are two-dimensionally arranged along the T direction and the S direction.

The distance between two light emitting units positioned at the opposite ends in the M direction is 90 micrometers, and the distance between two light emitting units positioned at the opposite ends in the S direction is 216 micrometers as one example.

Figure 4:
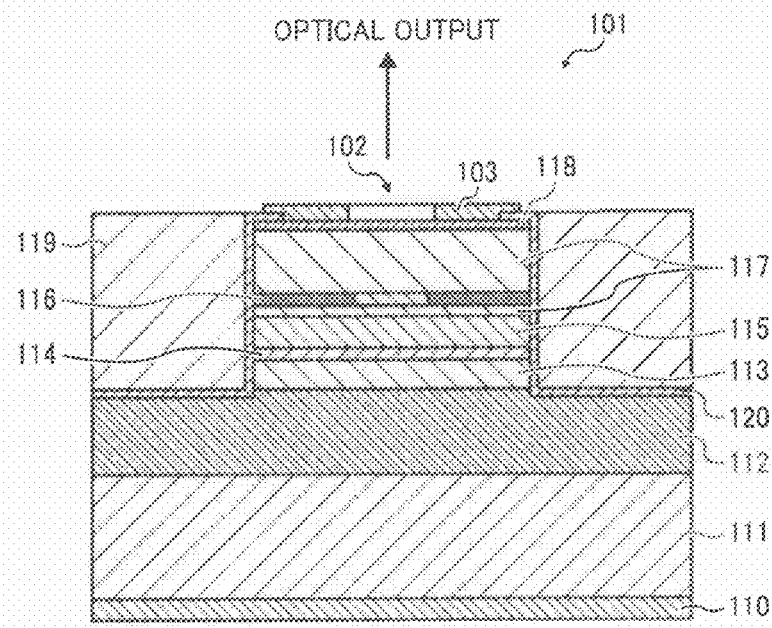
FIG. 4 is a schematic diagram for explaining a structure of each VCSEL in the two-dimensional array shown in FIG. 3.
Figure 5:
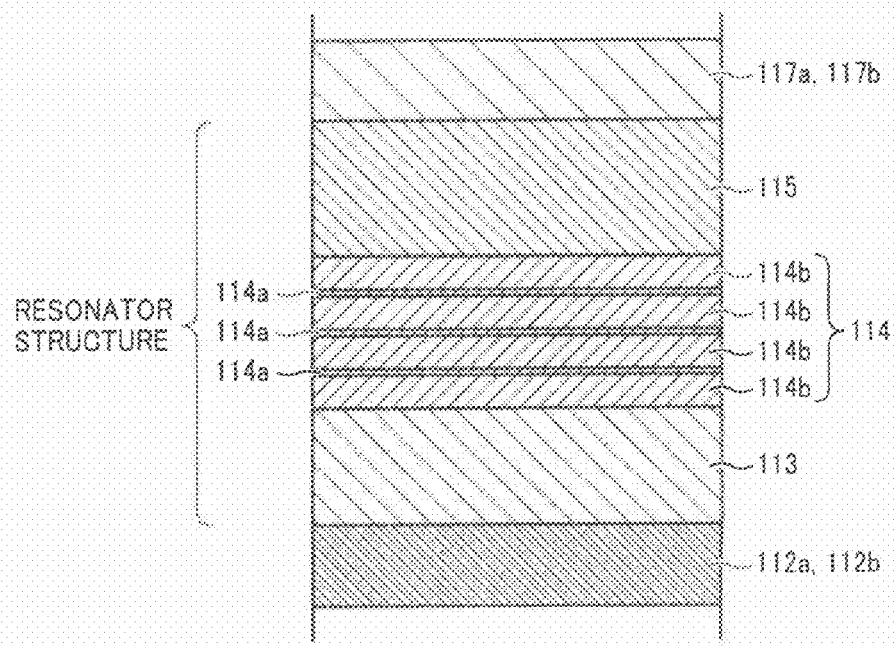
FIG. 5 is an enlarged view of part of the VCSEL shown in FIG. 4.

Each light emitting unit is a VCSEL of 780 nm (nanometer) band, and, as shown in FIG. 4, semiconductor layers such as a lower reflecting mirror 112, a spacer layer 113, an active layer 114, a spacer layer 115, an upper reflecting mirror 117, and a p-contact layer 118 are sequentially laminated on an n-GaAs substrate 111. The one in which a plurality of semiconductor layers are laminated is hereinafter refereed to as a "laminated body". FIG. 5 is an enlarged view around the active layer 114.

The lower reflecting mirror 112 has 40.5 pairs of an n-$Al_{0.9}Ga_{0.1}As$ low refractive index layer (low refractive index layer 112a) and an n-$Al_{0.3}Ga_{0.7}As$ high refractive index layer (high refractive index layer 112b). The refractive index layers are set to have an optical thickness of $\lambda/4$ in which $\lambda$ denotes an emission wavelength. A composition gradient layer (not shown), in which the composition is gradually changed from one composition to the other composition, is provided between the low refractive index layer 112a and the high refractive index layer 112b for reducing electrical resistance.

The spacer layer 113 is an $Al_{0.6}Ga_{0.4}As$ layer.

The active layer 114 includes, as shown in FIG. 5, an $Al_{0.12}Ga_{0.88}As$ quantum well layer 114a and an $Al_{0.3}Ga_{0.7}As$ barrier layer 114b.

The spacer layer 115 is an $Al_{0.6}Ga_{0.4}As$ layer.

The part including the spacer layer 113, the active layer 114, and the spacer layer 115 is referred to as a resonator structure, and the thickness thereof is set to have an optical thickness of one wavelength (the wavelength $\lambda$ is 780 nanometers) (see FIG. 5).

The upper reflecting mirror 117 has 24 pairs of a p-$Al_{0.9}Ga_{0.1}As$ low refractive index layer (low refractive index layer 117a) and a p-$Al_{0.3}Ga_{0.7}As$ high refractive index layer (high refractive index layer 117b). The refractive index layers are set to have an optical thickness of $\lambda/4$. The composition gradient layer (not shown), in which the composition is gradually changed from one composition to the other composition, is provided between the low refractive index layer 117a and the high refractive index layer 117b for reducing the electrical resistance.

An AlAs selected oxide layer 116 is provided at a position $\lambda/4$ away from the resonator structure in the upper reflecting mirror 117.

A manufacturing method of the two-dimensional array 100 is briefly explained below.

(1) The laminated body is created according to crystal growth using metal organic chemical vapor deposition (MOCVD method) or molecular beam epitaxy (MBE method).

(2) A slot is formed around each region, which becomes the light emitting unit, by dry etching to form a "mesa". An etching bottom face is set to reach the inside of the lower reflecting mirror 112. The etching bottom needs only to exceed at least the selected oxide layer 116. Accordingly, the selected oxide layer 116 appears on a side wall of the slot. Further, it is preferred that the size (diameter) of the mesa is 10 micrometers or more. If the mesa is too small, heat can be accumulated at the time of operation of the device, to negatively affect a light emitting characteristic. Further, it is preferred that the width of the slot is 5 micrometers or more. It is because if the width of the slot is too narrow, etching control becomes difficult.

(3) The laminated body with the slot formed thereon is heat-treated in water vapor, to selectively oxidize part of the selected oxide layer 116 in the mesa, thereby changing the part to an $Al_xO_y$ insulator layer. At this time, an unoxidized AlAs region in the selected oxide layer 116 remains at a central part of the mesa. Accordingly, current bottleneck structure is formed, which restricts a route of a driving current for the light emitting unit to only the central part of the mesa.

(4) An $SiO_2$ protective layer 120 having a thickness of, for example, 150 nanometers is provided, excluding a region where an upper electrode 103 is formed and a light emitting unit 102 in each mesa, and a polyimide 119 is buried in each slot for planarization.

(5) The upper electrode 103 is formed on a region excluding the light emitting unit 102 on the p-contact layer 118 in each mesa, to form each bonding pad (not shown) around the laminated body. A wiring (not shown) for connecting each upper electrode 103 with the corresponding bonding pad is formed.

(6) A lower electrode (n-side common electrode) 110 is formed on the other side of the laminated body.

(7) The laminated body is cut into a plurality of chips.

Referring back to FIG. 2, the coupling lens 15 substantially collimates the light emitted from the light source 14a.

The aperture plate 23 is arranged on an optical path between the coupling lens 15 and the cylindrical lens 17, and has an aperture for specifying a beam diameter of the light via the coupling lens 15 at least in the sub-scanning direction. Because the aperture plate 23 uses the light reflected around the aperture for monitoring, the aperture plate 23 is arranged inclined with respect to a virtual surface vertical to a traveling direction of the light from the light source 14a toward the polygon mirror 13a. Accordingly, it can be prevented that the light reflected around the aperture returns to the light source 14a. The light from the polygon mirror 13a toward the light source 14a can be also shaded.

The cylindrical lens 17 is arranged on the optical path between the aperture plate 23 and the reflecting mirror 18, and images the light having passed through the aperture in the aperture plate 23 in the sub-scanning direction, near the deflection-reflecting surface of the polygon mirror 13a via the reflecting mirror 18.

A soundproof glass 21 is arranged between the cylindrical lens 17 and the polygon mirror 13a, and between the polygon mirror 13a and the deflector-side scanning lens 11a.

The optical system arranged on the optical path between the light source 14a and the polygon mirror 13a is also referred to as a coupling optical system. In the first embodiment, the coupling optical system includes the coupling lens 15, the aperture plate 23, the cylindrical lens 17 and the reflecting mirror 18.

The polygon mirror 13a has a quaternary mirror, and each mirror becomes the deflection-reflecting surface. The polygon mirror 13a rotates at equal velocity around a rotation axis parallel to the sub-scanning direction.

The deflector-side scanning lens 11a is arranged on the optical path of the light deflected by the polygon mirror 13a.

The image-surface side scanning lens 11b is arranged on the optical path of the light via the deflector-side scanning lens 11a.

The optical system arranged on the optical path between the polygon mirror 13a and the photosensitive drum 1030 is also referred to as a scanning optical system. In the first embodiment, the scanning optical system includes the deflector-side scanning lens 11a and the image-surface side scanning lens 11b. An optical system, which corresponds to the VCSEL, in which a lateral magnification in the sub-scanning direction does not change in the main scanning direction, is used for the scanning optical system.

Figure 6:
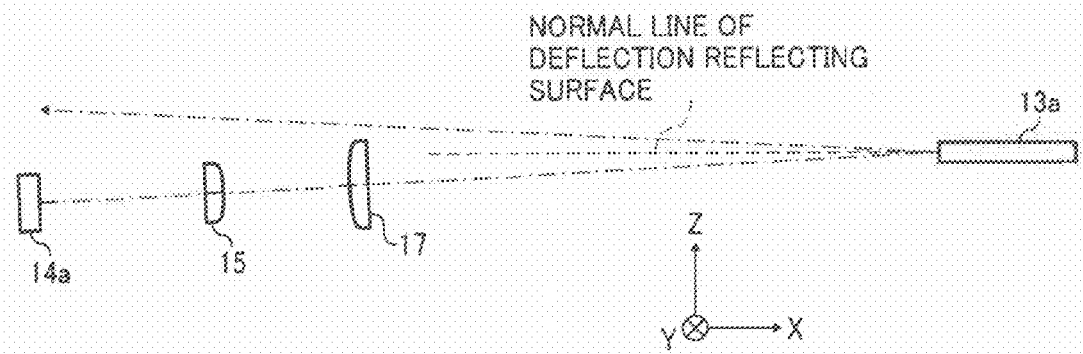
FIG. 6 is a schematic diagram for explaining an inclination of light with respect to a normal direction of a deflection-reflecting surface.
Figure 7:
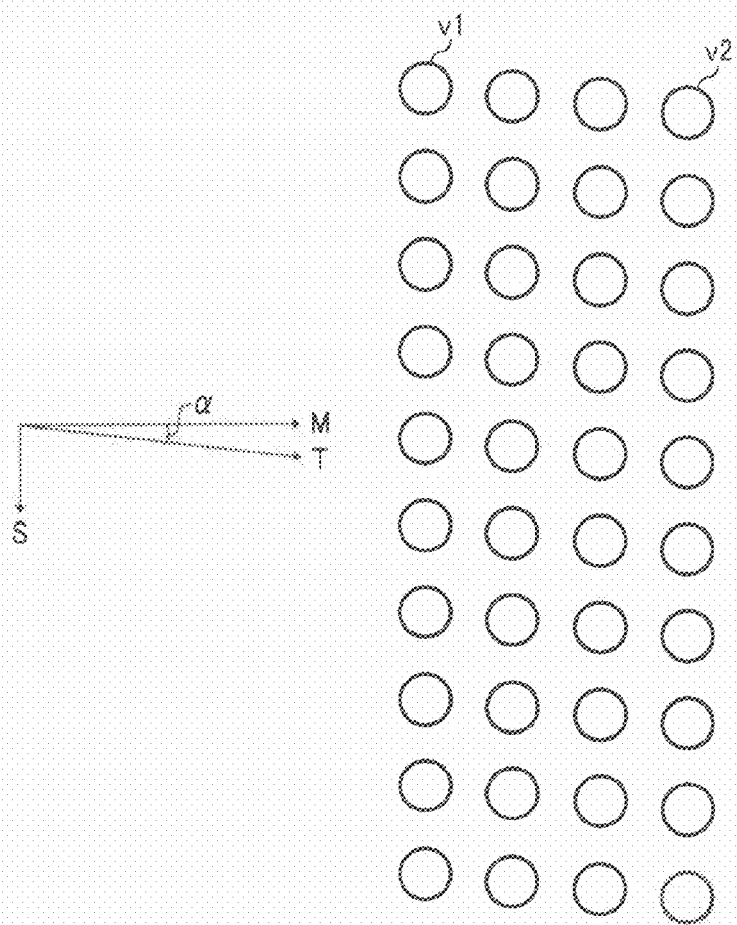
FIG. 7 is a schematic diagram for explaining light emitting units of the light source.

As one example, as shown in FIG. 6, optical axes of the coupling lens 15 and the cylindrical lens 17 are arranged inclined with respect to a normal direction of the deflection-reflecting surface of the polygon mirror 13a in the sub-scanning direction. That is, the coupling optical system is a grazing incidence optical system. For simplicity, in FIG. 6, the optical path from the reflecting mirror 18 toward the polygon mirror 13a is rotated to match the X-axis direction.

Accordingly, the light from the light source 14a is incident to the deflection-reflecting surface as being inclined with respect to the normal direction of the deflection-reflecting surface in the sub-scanning direction (grazing incidence). In this case, it can be prevented that the light reflected by the deflection-reflecting surface returns to the light source side. When the optical axes of the coupling lens 15 and the cylindrical lens 17 are arranged to match the normal direction of the deflection-reflecting surface, the light emitted from the light source 14a enters the deflection-reflecting surface parallel to the normal direction of the deflection-reflecting surface, and the light reflected by the deflection-reflecting surface can return to the light source side.

The angle of the grazing incidence by the coupling optical system (the angle of inclination with respect to the normal direction of the deflection-reflecting surface) is set in a range of from 0.5 degree to 1.0 degree. Because the angle of grazing incidence is small, deterioration of the beam spot diameter by wave front aberration and curvature of the scanning line seldom occur. Further, it is advantageous when deterioration of the optical performance is corrected by a special surface for the scanning lens, which has been proposed by the present inventors (see Japanese Patent Application Laid-Open No. 2006-72288).

When a light source having a plurality of light emitting units (multi-beam light source), the grazing incidence optical system, and the polygon mirror are used to scan the same surface to be scanned simultaneously by a plurality of beams, even with the beams directed toward the same image height, the angle of rotation of the polygon mirror is different according to the position of the light emitting unit. Therefore, a deviation between image heights with an interval of two scanning lines adjacent to each other (sub-scanning beam pitch) in the sub-scanning direction on the surface to be scanned (hereinafter, "sub-scanning beam pitch deviation") can occur due to an influence of an optical sag.

This phenomenon is explained by the light from the two light emitting units (light emitting units v1 and v2 shown in FIG. 7) away from each other in the M direction in the two-dimensional array 100. The light from the light emitting unit v1 and the light from the light emitting unit v2 enter the deflection-reflecting surface from different directions on a plane perpendicular to the sub-scanning direction. Therefore, to deflect the light from the light emitting unit v1 and the light from the light emitting unit v2 to the same image height, the angle of rotation of the polygon mirror needs to be different. At this time, because the rotation axis of the polygon mirror (rotation center) is not on the deflection-reflecting surface, the optical sag occurs.

Figure 8A:
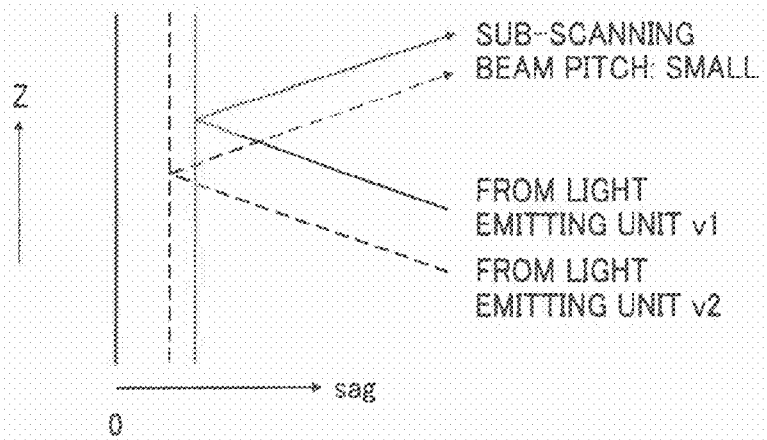
FIGS. 8A and 8B are schematic diagrams for explaining sags of light from the light emitting units in a polygon mirror.
Figure 8B:
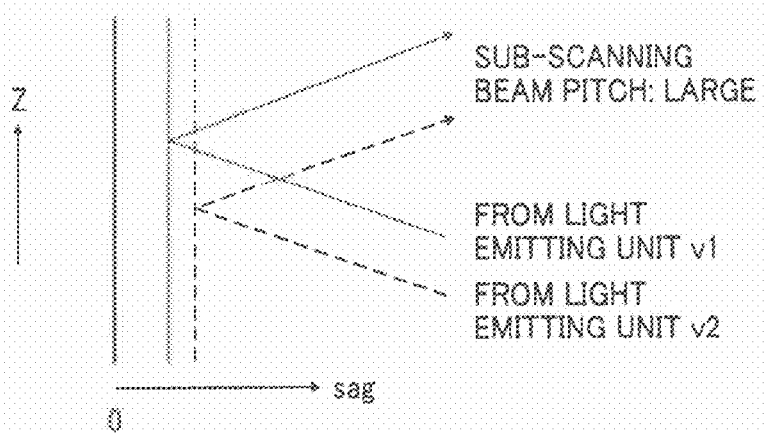

As one example, in FIG. 8A, the sag on the deflection-reflecting surface when the light from the light emitting unit v1 and the light from the light emitting unit v2 are directed toward the image height of −150 millimeters is shown. In FIG. 8B, the sag on the deflection-reflecting surface when the light from the light emitting unit v1 and the light from the light emitting unit v2 are directed toward the image height of +150 millimeters is shown. In either case, the sag amount is different between the light from the light emitting unit v1 and the light from the light emitting unit v2. The sub-scanning beam pitches at the position of the image height of −150 millimeters and at the position of the image height of +150 millimeters are different from each other.

Figure 9:
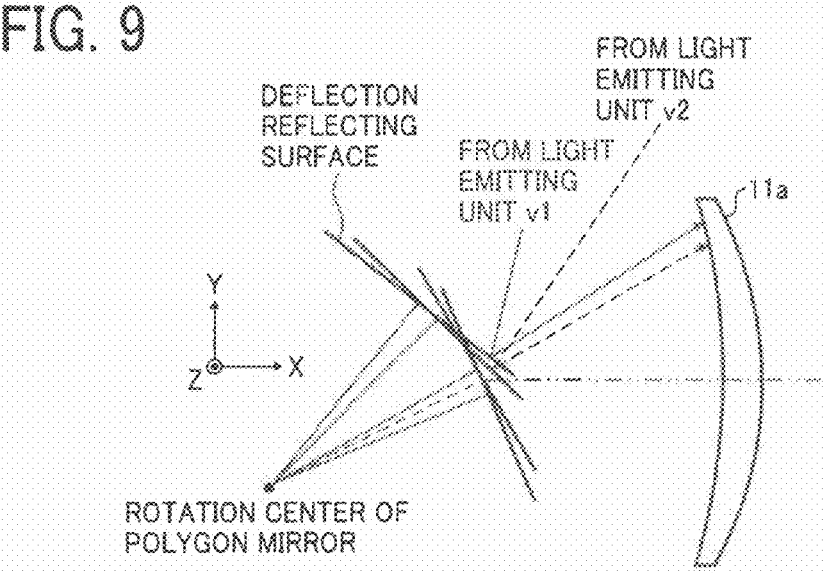
FIG. 9 is a schematic diagram for explaining a sub-scanning beam pitch deviation.

As shown in FIG. 9, light beams directed toward the same image height are shifted in the main scanning direction due to the influence of the sag, resulting in a difference in the position where the light beams pass through the deflector-side scanning lens 11a. In the grazing incidence optical system, the scanning beams are curved in the sub-scanning direction and enter the deflector-side scanning lens 11a due to a difference in the optical path length from the deflection-reflecting surface to the deflector-side scanning lens 11a. Therefore, if the beams are shifted in the main scanning direction, the refracting power received in the sub-scanning direction changes, to change the position of the beam spot in the sub-scanning direction on the surface to be scanned, and in the multi beams, the sub-scanning beam pitch becomes different between image heights, that is, there is a deviation (sub-scanning beam pitch deviation).

However, in the first embodiment, the plurality of light emitting units are arranged two-dimensionally, and the distance between two light emitting units at opposite ends in the direction corresponding to the main scanning direction is smaller than that between two light emitting units at opposite ends in the direction corresponding to the sub-scanning direction. Accordingly, the sub-scanning beam pitch deviation can be reduced.

Referring back to FIG. 2, the imaging lens 24 focuses the light reflected by the aperture plate 23. The photodiode 25 is arranged near the light convergence position, and outputs a signal corresponding to the amount of light received (photoelectric conversion signal). The output signal of the photodiode 25 is used for monitoring the quantity of light emitted from the light source 14a, and a drive current for the light emitting units is corrected based on the monitoring result.

In the optical scanning device 1010, the monitoring optical system includes the aperture plate 23 and the imaging lens 24.

The quantity of emitted light from each of the light emitting units can be detected by, for example, a time-division detection method of sequentially lighting up the light emitting units, or a method in which at least two light emitting units are set in a group and a plurality of groups in various combinations are sequentially lighted up in a group to detect the quantity of emitted light from each group and the quantity of emitted light from each light emitting unit is calculated based on the result.

Thus, because the quantity of light emitted from the light emitting units can be individually known by one monitoring optical system, the optical system can be simplified and the number of parts can be reduced. As a result, a low-cost and small-sized apparatus can be realized.

As explained above, according to the first embodiment, the optical scanning device 1010 includes the light source 14a having a plurality of light emitting units, the polygon mirror 13a that deflects the light from the light source 14a, the coupling optical system arranged on the optical path between the light source 14a and the polygon mirror 13 to guide the light from the light source 14a to the polygon mirror 13a, the scanning optical system that guides the light deflected by the polygon mirror 13a to the photosensitive drum 1030, and the monitoring optical system that monitors the quantity of light emitted from the light source 14*a*. The coupling optical system is arranged so that the light from the light source 14*a* enters from a direction inclined with respect to the normal direction of the deflection-reflecting surface in the sub-scanning direction. Accordingly, light reflected by the deflection-reflecting surface can be prevented from returning to the light source side. Thus, the quantity of light emitted from the light source 14*a* can be accurately monitored.

Because the light source 14*a* has the two-dimensional array of the VCSELs, high speed and high density can be realized.

The light emitting units are two-dimensionally arranged so that the distance between two light emitting units at opposite ends in the direction corresponding to the main scanning direction is smaller than that between two light emitting units at opposite ends in the direction corresponding to the sub-scanning direction. Thus, the sub-scanning beam pitch deviation due to multi beams, which is peculiar to the grazing incidence optical system, can be reduced. As a result, beams can scan the photosensitive drum 1030 very stably.

Because of the optical scanning device 1010 capable of stably scanning the photosensitive drum 1030 with light beams, the printer 1000 is capable of forming a high quality image at high speed.

Figure 10:
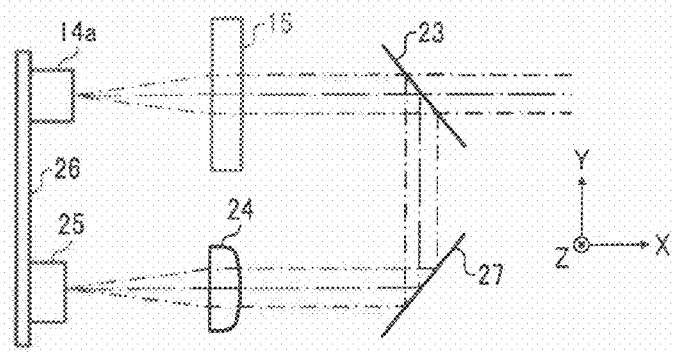
FIG. 10 is a schematic diagram of a first modification of a monitoring optical system.

As shown in FIG. 10, the monitoring optical system can include the aperture plate 23, the reflecting mirror 27, and the imaging lens 24. In this case, the aperture plate 23 is arranged so that the light from the light source 14*a* is reflected around the aperture in a −Y direction, and the reflecting mirror 27 is arranged so that the reflected light from the aperture plate 23 is reflected in a −X direction. Accordingly, the light source 14*a* and the photodiode 25 can be equipped on the same substrate 26, thereby enabling miniaturization of the apparatus.

Figure 11:
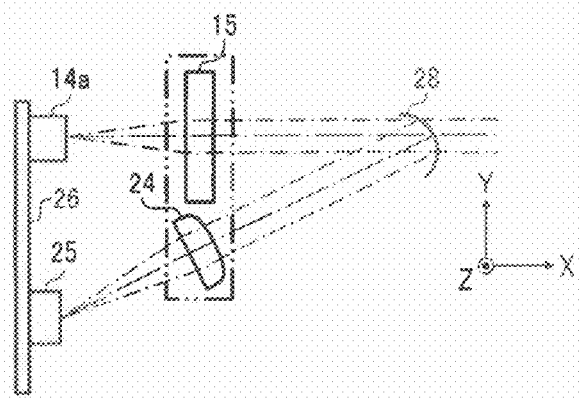
FIG. 11 is a schematic diagram of a second modification of a monitoring optical system.

The monitoring optical system can include, as shown in FIG. 11, a curved mirror 28 having an opening and the imaging lens 24. The curved mirror 28 has a positive power. In this case, the light source 14*a* and the photodiode 25 can be equipped on the same substrate 26, and the number of reflection of the monitoring light can be made only once. Accordingly, beam-spot position errors in the photodiode 25 can be reduced, and the photodiode 25 can be made smaller. Accordingly, lower cost and smaller size of the apparatus can be realized. Because the reflecting mirror 27 is not required, the number of parts can be reduced. In this case, the coupling lens 15 and the imaging lens 24 can be integrated. At this time, the coupling lens 15 and the imaging lens 24 can be one resin molded article.

In the first embodiment, the polygon mirror is used as a deflector; however, other types of mirrors, for example, a vibrating mirror can also be used as a deflector. The vibrating mirror is a micro mirror that causes sine vibration of a resonant structure, using, for example, micromachine technology. Accordingly, the apparatus can be miniaturized, and banding, temperature increase, noise, power consumption, and the like can be reduced considerably.

When the vibrating mirror is used as the deflector, the optical sag occurring at the time of deflecting the light can be reduced than in the polygon mirror. It is because the rotation center of the vibrating mirror is positioned substantially on the deflection-reflecting surface, and the sag does not occur or becomes very small even when a deflection angle changes. Accordingly, a change of the space between the respective beams in the sub-scanning direction on the deflection-reflecting surface can be reduced over the whole image height. As a result, the sub-scanning beam pitch deviation on the photosensitive drum can be further reduced.

The deflection-reflecting surface of the vibrating mirror is very small; however, it is applicable because the distance between two light emitting units on the opposite sides in the main scanning direction is small in the two-dimensional array 100. As for the sub-scanning direction, the beams are narrowed down by the cylindrical lens and the like, and the space between respective beams is set to be sufficiently small to obtain a desired sub-scanning beam pitch on the photosensitive drum.

Figure 12:
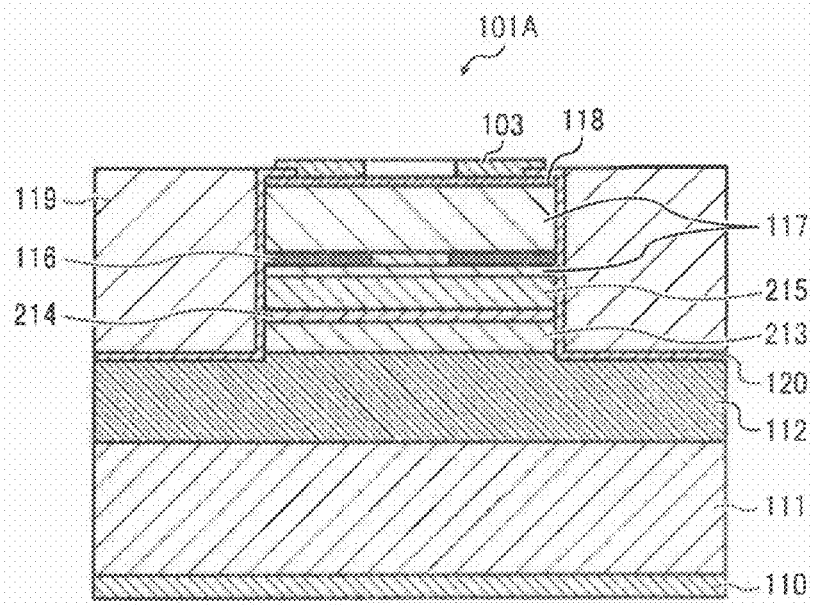
FIG. 12 is a schematic diagram for explaining a modification of the VCSEL.
Figure 13:
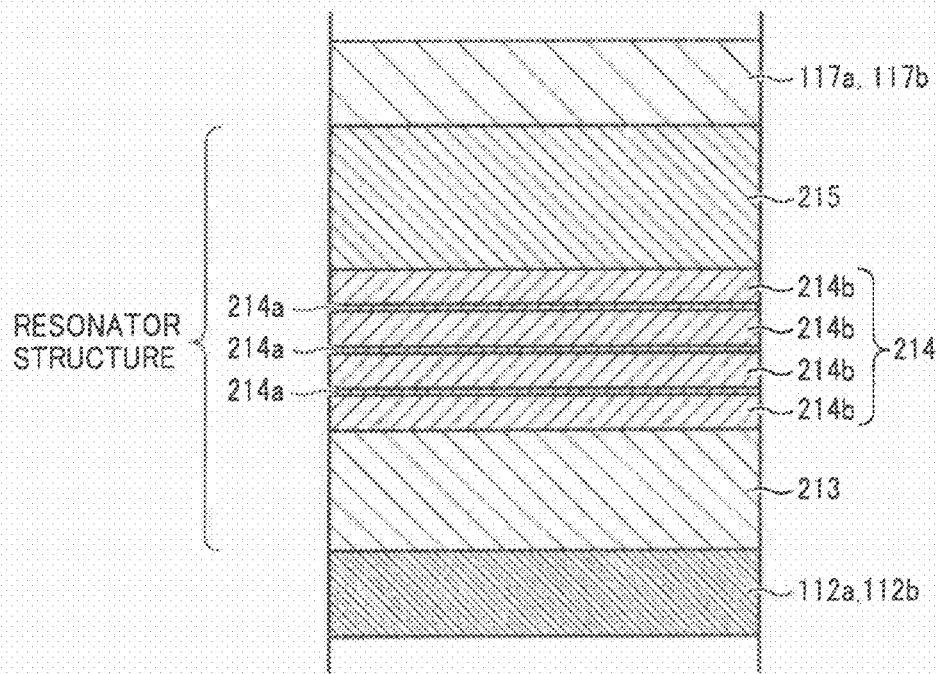
FIG. 13 is an enlarged view of part of the VCSEL shown in FIG. 12.

As shown in FIGS. 12 to 14, instead of the two-dimensional array 100, a two-dimensional array (two-dimensional array 100A) can be used, in which part of the semiconductor layers in the two-dimensional array 100 is made of different materials. In the two-dimensional array 100A, the spacer layer 113 in the two-dimensional array 100 is replaced by a space layer 213, the active layer 114 is replaced by an active layer 214, and the spacer layer 115 is replaced by a spacer layer 215.

The spacer layer 213 is an $(Al_{0.7}Ga_{0.3})_{0.5}In_{0.5}P$ layer having a wide bandgap.

The active layer 214 includes, as shown in FIG. 13, three GaInPAs quantum well layers 214*a* having a composition in which a compressive strain remains and having a band gap wavelength of 780 nanometers and four $Ga_{0.6}In_{0.4}P$ barrier layers 214*b* having a tensile strain, which is lattice-matched with the quantum well layers.

The spacer layer 215 is an $(Al_{0.7}Ga_{0.3})_{0.5}In_{0.5}P$ layer having a wide bandgap.

A part formed of the spacer layer 213, the active layer 214, and the spacer layer 215 is referred to as a resonator structure, and the thickness thereof is set to one wavelength optical thickness (see FIG. 13).

In the two-dimensional array 100A, an AlGaInP material is used for the spacer layer. Therefore, a bandgap difference between the spacer layer and the active layer can be made larger than that of the two-dimensional array 100 of the first embodiment.

FIG. 14 is a table of bandgap difference between the spacer layer and the quantum well layer and between the barrier layer and the quantum well layer of VCSELs. The VCSELs include a VCSEL in which the material of the spacer layer/quantum well layer is AlGaAs/AlGaAs and the wavelength thereof is 780 nanometers (hereinafter, "VCSEL_A."), a VCSEL in which the material of the spacer layer/quantum well layer is AlGaInP/GaInPAs and the wavelength thereof is 780 nanometers (hereinafter, "VCSEL_B"), and a VCSEL in which the material of the spacer layer/quantum well layer is AlGaAs/GaAs and the wavelength thereof is 850 nanometers (hereinafter, "VCSEL_C"). The VCSEL_A corresponds to the VCSEL 101 in the two-dimensional array 100, and the VCSEL_B with x=0.7 corresponds to the VCSEL in the two-dimensional array 100A (VCSEL 101A).

It is seen that the VCSEL_B can have a larger bandgap difference than that of the VCSEL_A and the VCSEL_C. Specifically, the bandgap difference between the spacer layer and the quantum well layer is 767.3 megaelectron volts (meV), which is quite larger than 465.9 meV of the VCSEL_A. Further, the VCSEL_B has a significant bandgap difference between the barrier layer and the quantum well layer as well, enabling excellent carrier confinement.

Because the VCSEL 101A has a compressive strain in the quantum well layer, a gain largely increases due to a band separation between a heavy hole and a light hole, thereby enabling high gain, and therefore high output with a low threshold. Accordingly, a reflectivity of the reflecting mirror on a light extracting side (the upper reflecting mirror 117) can be decreased, thereby enabling higher output. Further, because the high gain can be achieved, an optical output decrease due to a temperature rise can be suppressed, and the space between respective VCSELs in the two-dimensional array can be further narrowed down.

Further, in the VCSEL 101A, because the quantum well layer 214a and the barrier layer 214b are made of a material, which does not contain aluminum (Al), oxygen uptake to the active layer 214 can be reduced. As a result, formation of a non-radiative recombination center can be suppressed, thereby enabling a longer life.

For example, when the two-dimensional array of the VCSELs is used for a optical writing unit, if the service life of the VCSEL is short, the optical writing unit is wasted. However, because the VCSEL 101A has a long life, the optical writing unit using the two-dimensional array 100A can be reused. Accordingly, resource protection is facilitated and environmental loads can be reduced. This is also applicable to other apparatuses using the two-dimensional array of the VCSEL.

In the first embodiment, the light emitting units emits laser beams having a wavelength of 780 nanometers; however, the wavelength needs only to correspond to sensitivity characteristics of the photosensitive drum 1030. In this case, at least part of the material constituting each light emitting unit, or at least part of the configuration of each light emitting unit is changed according to the emission wavelength.

In the first embodiment, the image forming apparatus is explained as a printer; however, any image forming apparatus including the optical scanning device 1010 can form a high quality image at a high speed.

A modification of the first embodiment is explained next with reference to FIGS. 15 to 18. FIG. 15 is a schematic diagram of a printer 1000A as an image forming apparatus according to the modification of the first embodiment.

The printer 1000A is a tandem multicolor-image forming apparatus that superimposes four color images (black, cyan, magenta, and yellow) to form a full-color image. The printer 1000A includes an optical scanning device 1010A, photosensitive drums (30a, 30b, 30c, and 30d), chargers (32a, 32b, 32c, and 32d), developing rollers (33a, 33b, 33c, and 33d), toner cartridges (34a, 34b, 34c, and 34d), cleaning cases (31a, 31b, 31c, and 31d), a transfer belt 40, a feed tray 60, a feed roller 54, a pair of registration rollers 56, a fuser roller 50, an eject tray 70, an eject roller 58, and a controller (not shown) that controls the respective units.

As shown in FIG. 16, the optical scanning device 1010A includes light source units (200a and 200b), aperture plates (201a and 201b), light dividing prisms (202a and 202b), cylindrical lenses (204a, 204b, 204c, and 204d), a polygon mirror 104, fθ lenses (105a, 105b, 105c, and 105d), folding mirrors (106, 106b, 106c, 106d, 108a, 108b, 108c, and 108d), toroidal lenses (107a, 107b, 107c, and 107d), convergent lenses (156a and 156b), and photodetectors (157a and 157b).

Each of the light source unit 200a and 200b includes a light source having the two-dimensional array 100 or the two-dimensional array 100A, and a coupling lens that substantially collimates the light emitted from the light source.

The aperture plate 201a has an aperture for specifying a beam diameter of the light from the light source 200a. The aperture plate 201b has an aperture for specifying a beam diameter of the light from the light source 200b. Because the aperture plates use the light reflected around the aperture for monitoring, the aperture plates are arranged inclined with respect to the corresponding light source unit. Accordingly, it can be prevented that the light reflected around the aperture returns to the light source unit.

The light dividing prism 202a divides the light having passed through the aperture of the aperture plate 201a two beams parallel to each other with a predetermined interval in the Z-axis direction. The light dividing prism 202b divides the light having passed through the aperture of the aperture plate 201b into two beams parallel to each other with a predetermined interval in the Z-axis direction.

The cylindrical lens 204a is arranged on the optical path of a beam on a +/− side of the two beams from the light dividing prism 202a (hereinafter, "black beam"), and converges the black beam near the deflection-reflecting surface of the polygon mirror 104 in the sub-scanning direction.

The cylindrical lens 204b is arranged on the optical path of a beam on a +Z side of the two beams from the light dividing prism 202a (hereinafter, "cyan beam"), and converges the cyan beam near the deflection-reflecting surface of the polygon mirror 104 in the sub-scanning direction.

The cylindrical lens 204c is arranged on the optical path of the beam on the +Z side of the two beams from the light dividing prism 202b (hereinafter, "magenta beam"), and converges the magenta beam near the deflection-reflecting surface of the polygon mirror 104 in the sub-scanning direction.

The cylindrical lens 204d is arranged on the optical path of the beam on the −Z side of the two beams from the light dividing prism 202b (hereinafter, "yellow beam"), and converges the yellow beam near the deflection-reflecting surface of the polygon mirror 104 in the sub-scanning direction.

The polygon mirror 104 has a four-sided mirror of a two-stage structure, and each mirror becomes the deflection-reflecting surface. The polygon mirror 104 is arranged so that the light from the cylindrical lens 204a and the light from the cylindrical lens 204d are deflected by the deflection-reflecting surface on a first stage (lower stage), and the light from the cylindrical lens 204b and the light from the cylindrical lens 204c are deflected by the deflection-reflecting surface on a second stage (upper stage). The first deflection-reflecting surface and the second deflection-reflecting surface rotate with the phase being shifted by 45° from each other, and the scanning of the light is performed alternatively on the first and the second stages.

The fθ lenses 105a and 105b are arranged on a −X side of the polygon mirror 104, and the fθ lenses 105c and 105d are arranged on a +X side of the polygon mirror 104. That is, bi-directional scanning is employed.

The fθ lenses 105a and 105b are laminated in the Z-axis direction, and the fθ lens 105a faces the first-stage deflection-reflecting surface and the fθ lens 105b faces the second-stage deflection-reflecting surface. The fθ lenses 105c and 105d are laminated in the Z-axis direction, and the fθ lens 105c faces the second-stage deflection-reflecting surface and the fθ lens 105d faces the first-stage deflection-reflecting surface.

The black beam deflected by the polygon mirror 104 enters the fθ lens 105a, the yellow beam enters the fθ 105d, the cyan beam enters the fθ lens 105b, and the magenta beam enters the fθ lens 105c.

Figure 17A:
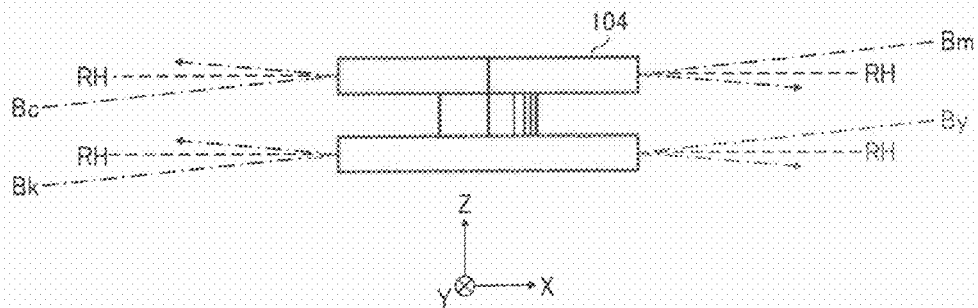
FIGS. 17A to 17C are schematic diagrams for explaining an optical path of light incident to a polygon mirror and light reflected by the polygon mirror.
Figure 17B:
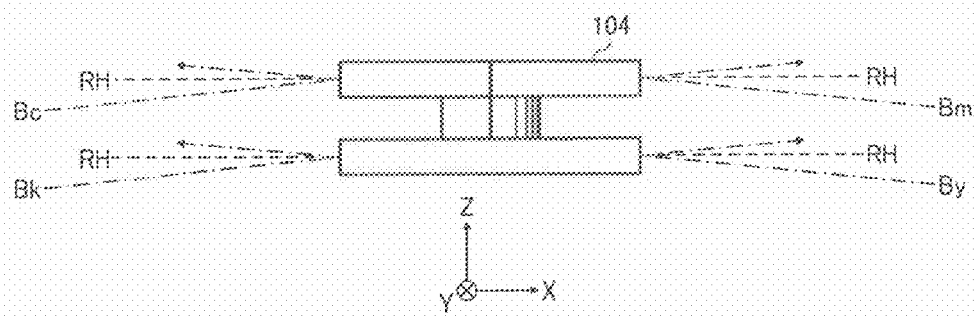
Figure 17C:
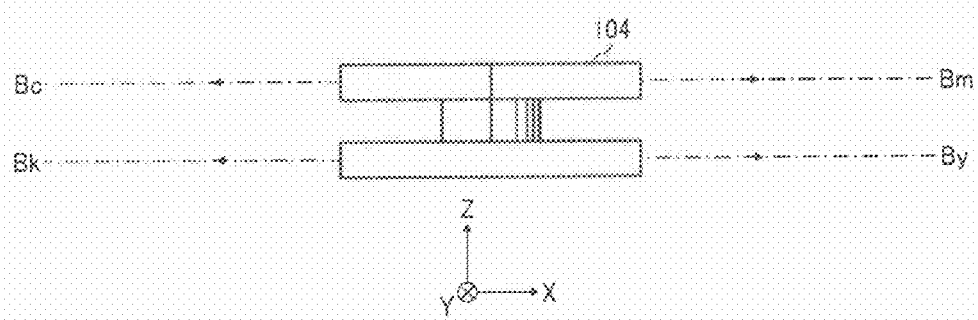

In the optical scanning device 1010A, as shown in FIG. 17A, a beam Bk from the cylindrical lens 204a and a beam Bc from the cylindrical lens 204b are set to enter the polygon mirror 104 as being inclined to the −Z side with respect to the normal direction RH of the deflection-reflecting surface of the polygon mirror 104. A beam Bm from the cylindrical lens 204c and a beam By from the cylindrical lens 204d are set to enter the polygon mirror 104 as being inclined to the +Z side with respect to the normal direction RH of the deflection-reflecting surface of the polygon mirror 104. That is, the beams incident to the −X side of the polygon mirror 104 and the beams incident to the +Z side are inclined to the opposite sides with respect to the direction perpendicular to the polygon mirror 104 at least in the sub-scanning direction.

The angle of inclination of the beam Bk from the cylindrical lens 204a and that of the beam Bc from the cylindrical lens 204b are equal to each other, and the angle of inclination of the beam Bm from the cylindrical lens 204c and that of the beam By from the cylindrical lens 204d are equal to each other.

The size of the angle of inclination of the beam Bk from the cylindrical lens 204a and that of the beam Bc from the cylindrical lens 204b, and the size of the angle of inclination of the beam Bm from the cylindrical lens 204c and that of the beam By from the cylindrical lens 204d are equal to each other. The angle of inclination is set here to a range of from 0.5 degree to 1.0 degree as one example.

Figure 18:
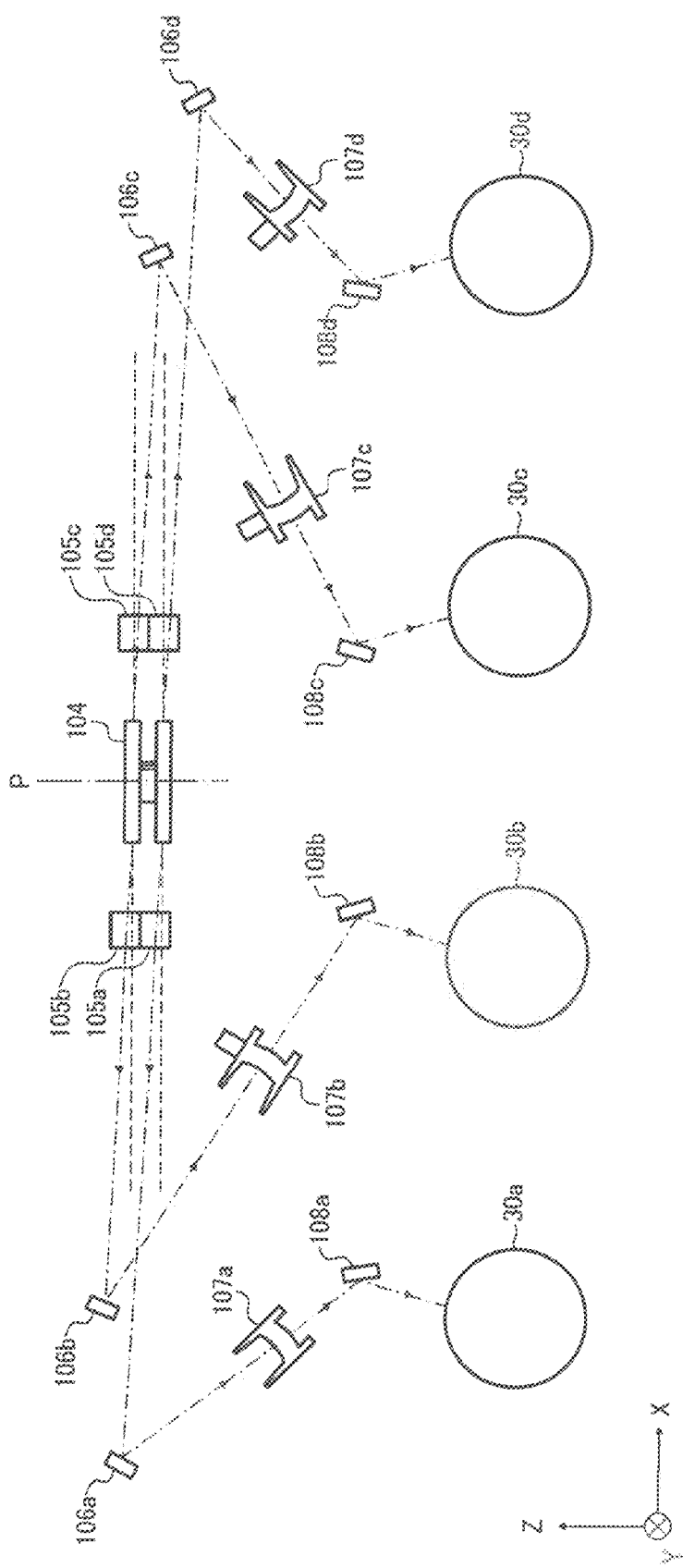
FIG. 18 is a side view of the optical scanning device shown in FIG. 16.

The black beam transmitted through the fθ lens 105a is imaged in a spot on the photosensitive drum 30a via the folding mirror 106a, the toroidal lens 107a, and the folding mirror 108a (see FIG. 18).

The cyan beam transmitted through the fθ lens 105b is imaged in a spot on the photosensitive drum 30b via the folding mirror 106b, the toroidal lens 107b, and the folding mirror 108b (see FIG. 18).

The magenta beam transmitted through the fθ lens 105c is imaged in a spot on the photosensitive drum 30c via the folding mirror 106c, the toroidal lens 107c, and the folding mirror 108c (see FIG. 18).

The yellow beam transmitted through the fθ lens 105d is imaged in a spot on the photosensitive drum 30d via the folding mirror 106d, the toroidal lens 107d, and the folding mirror 108d (see FIG. 18).

According to the modification of the first embodiment, the two light sources each include the two-dimensional array 100 or the two-dimensional array 100A, and the beams from the two light sources are set to enter the polygon mirror, inclined with respect to the normal direction of the deflection-reflecting surface in the sub-scanning direction. Accordingly, the same effects as with the optical scanning device 1010 can be obtained.

The printer 1000A including the optical scanning device 1010A is capable of forming a high-quality multicolor image at a high speed.

Figure 19:
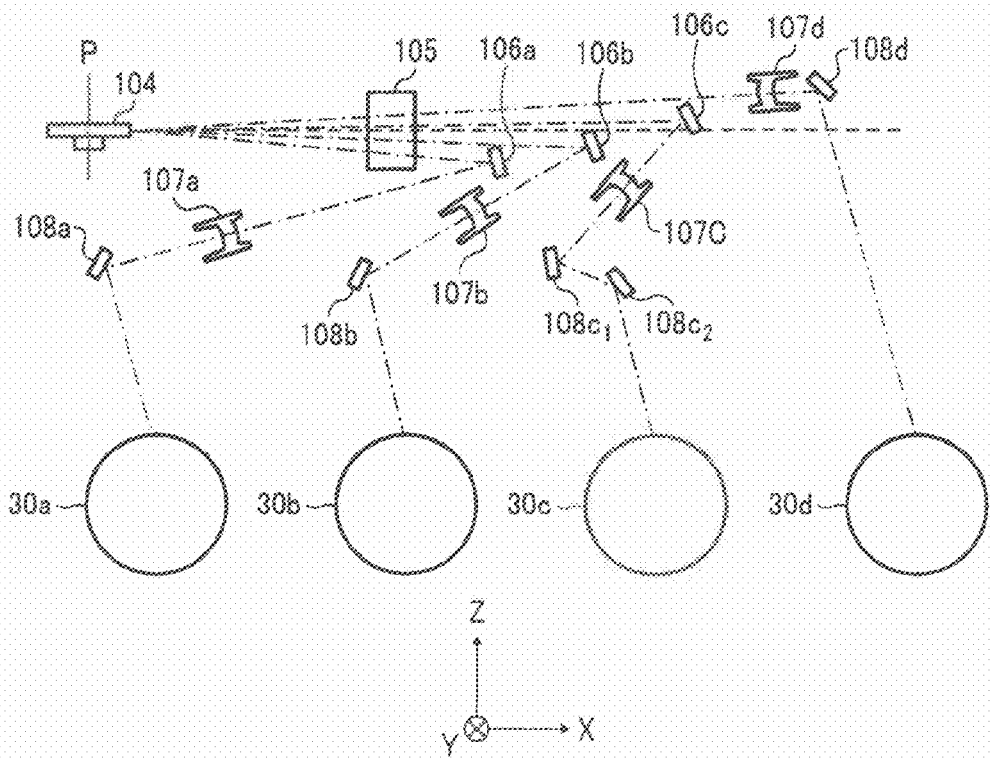
FIG. 19 is a schematic diagram for explaining an optical scanning device of one-directional scanning type.

In modification of the first embodiment, the optical scanning device 1010A is explained as being of bi-directional scanning type; however, as shown in FIG. 19, the optical scanning device can be of one-directional scanning type. The optical scanning device shown in FIG. 19 includes an fθ lens 105, and folding mirrors 108$c_1$ and 108$c_2$.

In this case, the beam Bk from the cylindrical lens 204a, the beam Bc from the cylindrical lens 204b, the beam Bm from the cylindrical lens 204c, and the beam By from the cylindrical lens 204d enter one side (+X side in FIG. 19) of the polygon mirror 104. At this time, the beams enter substantially the same position on the deflection-reflecting surface in the sub-scanning direction, and the angles of inclination of the respective beams are different from each other.

Also in this case, the same effects as those of the optical scanning device 1010A can be obtained.

Further, in this case, because the deflection-reflecting surface of the polygon mirror can be formed on one stage and the thickness in the sub-scanning direction can be reduced as compared to the case of the optical scanning device 1010A, an inertia as a rotator is small, thereby enabling to shorten start-up time. Accordingly, a low-cost optical scanning device with low power consumption can be realized. In addition, because a scanning optical system is provided only on one side of the polygon mirror, there is no need to consider the effect of a ghost light.

Figure 20:
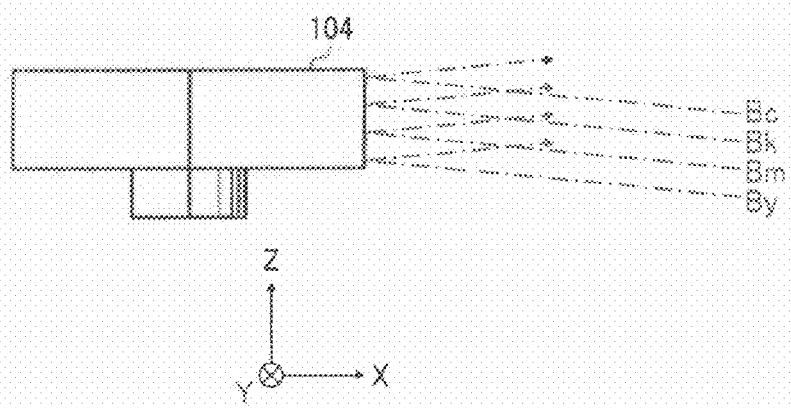
FIG. 20 is a schematic diagram of a modification of the optical scanning device shown in FIG. 19.

In this case, if the thickness of the deflection-reflecting surface in the sub-scanning direction can be increased, as shown in FIG. 20, the beams can be made to enter positions different from each other on the deflection-reflecting surface in the sub-scanning direction. At this time, the angle of inclination of the beams can be made the same.

In modification of the first embodiment, the vibrating mirror can be used instead of the polygon mirror 104.

Figure 21:
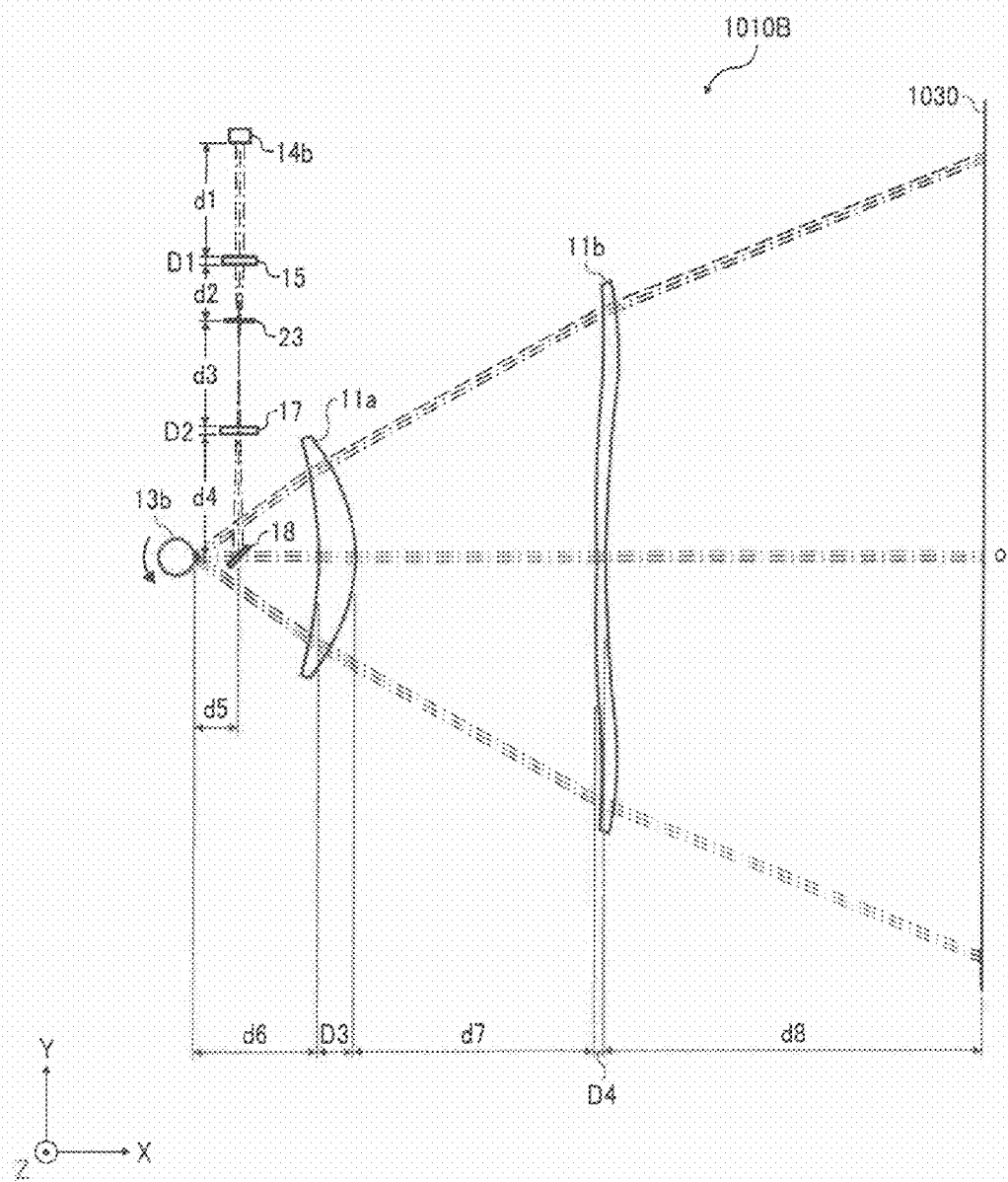
FIG. 21 is a schematic diagram of an optical scanning device according to a second embodiment of the present invention.

FIG. 21 is a schematic diagram of an optical scanning device 1010B according to a second embodiment of the present invention. The optical scanning device 1010B includes a light source 14b, the coupling lens 15, the aperture plate (aperture member) 23, the cylindrical lens (imaging lens) 17, and a reflecting mirror 14 sequentially arranged in the -Y direction from the light source 14b, a polygon mirror 13b arranged on the -X side of the reflecting mirror 14, and the deflector-side scanning lens 11a (first scanning lens) and the image-surface side scanning lens 11b (second scanning lens) sequentially arranged on the +X side of the reflecting mirror 14.

Figure 22:
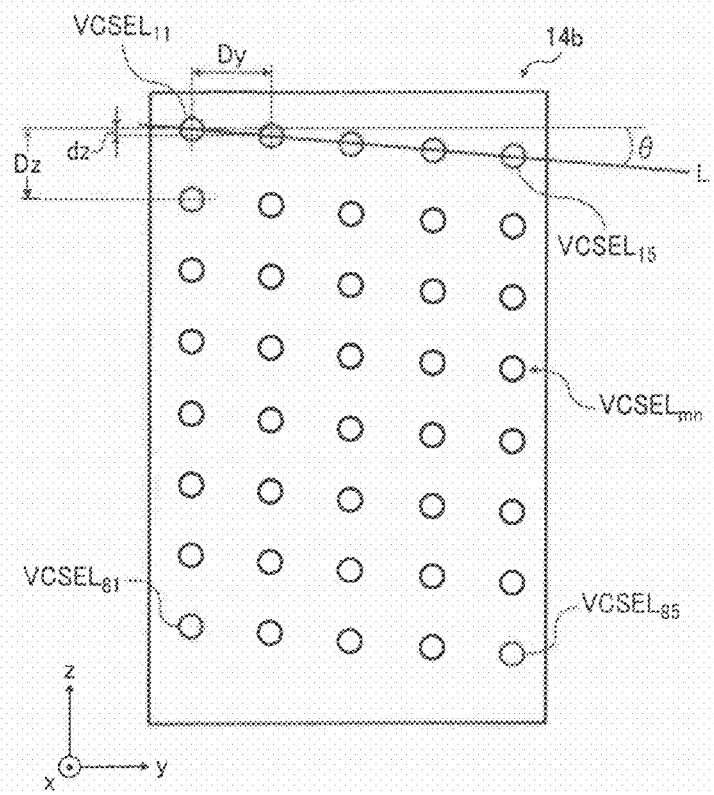
FIG. 22 is a schematic diagram of a light source of the optical scanning device shown in FIG. 21.

The light source 14b is a VCSEL array, for example, in which the VCSELs are two-dimensionally arranged as a source of luminescence, and as shown in FIG. 22, 40 VCSELs are arranged in a matrix of eight rows and 5 columns, in which a direction parallel to a straight line L forming an angle θ with the Y-axis is designated as a row direction, and a direction parallel to the Z axis is designated as a column direction. In each VCSEL, a diameter of a near-field pattern is 4 micrometers, and light beams having a wavelength of 780 nanometers are emitted with a divergence angle in the main and sub-scanning directions being 7±1 degrees. In the second embodiment, a row interval Dz is 24.0 micrometers, and a column interval Dy is 23.9 micrometers. An interval dz between adjacent VCSELs in the Z-axis direction (sub-scanning direction) is 4.8 micrometers (=Dz/5). In the explanations below, as shown in FIG. 3, the VCSEL positioned in the m-th row and the n-th column is referred to as VCSEL$_{mn}$.

Figure 23:
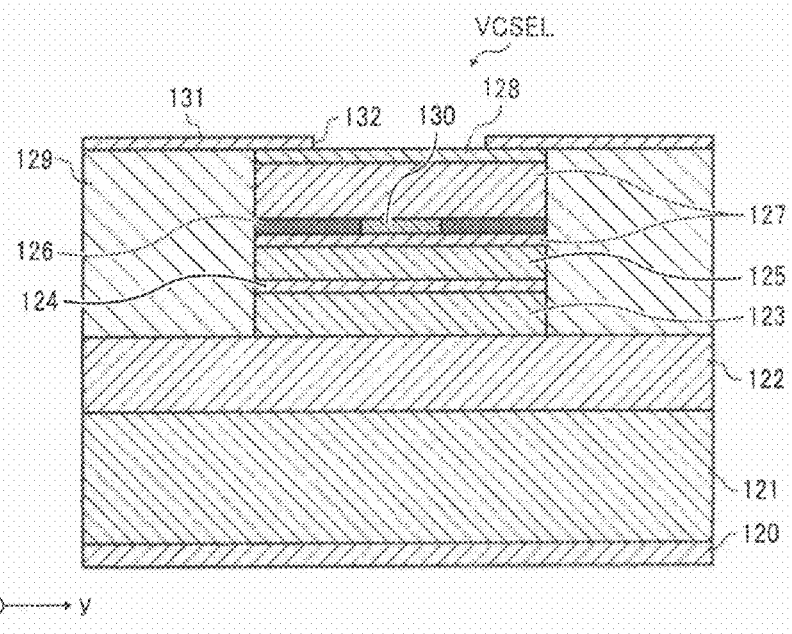
FIG. 23 is a sectional view of a VCSEL formed in the light source shown in FIG. 22.
Figure 24:
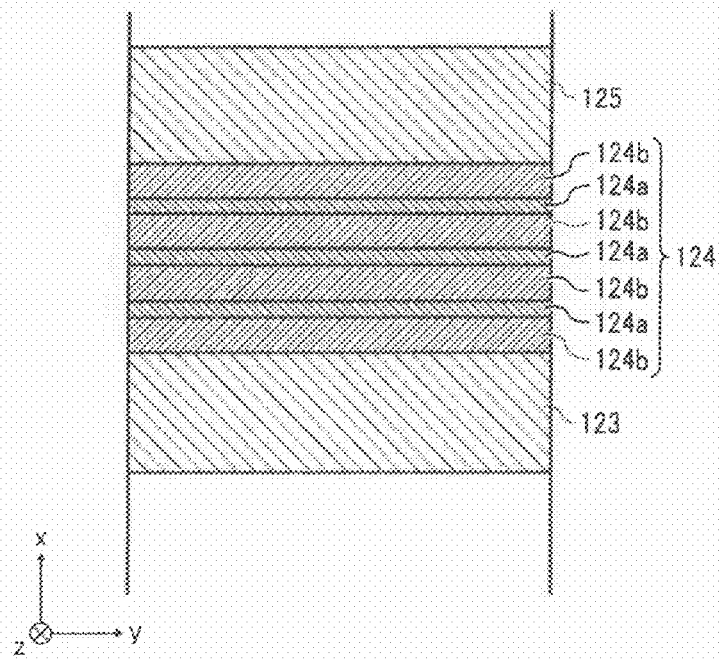
FIG. 24 is an enlarged view of an example of an active layer of the VCSEL shown in FIG. 23.

FIG. 23 is a sectional view of a 780 nm-band VCSEL. FIG. 24 is an enlarged view around an active layer 124 of the VCSEL. As can be seen from FIGS. 23 and 24, the VCSEL has a configuration in which a resonator region having an optical thickness of one wavelength and including the active layer 124 including an $Al_{0.12}Ga_{0.88}As$ quantum well layer 124a and an $Al_{0.3}Ga_{0.7}As$ barrier layer 124b, and $Al_{0.6}Ga_{0.4}As$ spacer layers 123 and 125 is put between a lower reflecting mirror 122 including 40.5 pairs of n-$Al_{0.3}Ga_{0.7}As$ high refractive index layer/n-$Al_{0.9}Ga_{0.1}As$ low refractive index layer and an upper reflecting mirror 127 including 124 pairs of p-$Al_{0.3}Ga_{0.7}As$ high refractive index layer/p-$Al_{0.9}Ga_{0.1}As$ low refractive index layer, with an optical thickness of λ/4 in each layer, on an n-GaAs substrate 121 on which the n-side common electrode 110 is formed. An AlAs selected oxide layer 130 surrounded by an $Al_xO_y$ current constriction layer 126 is provided on the upper reflecting mirror 117 at a position λ/4 away from the resonator region. A composition gradient layer (not shown), in which the composition is gradually changed, is provided between the reflecting mirrors 122 and 127 for reducing electrical resistance.

A forming method of the VCSEL provided on the light source 14b is explained. The layers are created according to the crystal growth using the metal organic chemical vapor deposition (MOCVD method) or the molecular beam epitaxy (MBE method).

A mesa shape is formed by forming a slot having a depth of, for example, 4.5 micrometers around a region, which becomes a device region, by dry etching. The etching bottom is generally provided at a position exceeding at least the AlAs selected oxide layer 130.

The AlAs selected oxide layer 130, whose side is exposed by the slot forming process by etching is heat treated in water vapor to oxidize the periphery thereof and change the peripheral part to an $Al_xO_y$ insulator layer, thereby forming the current constriction structure in which the route of element drive currents is restricted only to the unoxidized AlAs region at the central part.

An $SiO_2$ protective layer (not shown) having a thickness of, for example, 150 nanometers is provided excluding a region where an upper electrode (p-side individual electrode) 131 is formed on each device region and an light emitting unit 132, and the etching portion is buried with polyimide 129 for planarization.

The polyimide and the $SiO_2$ protective layer (not shown) on a p-contact layer 128 in each device region and the upper reflecting surface including the light emitting unit are removed and the p-side individual electrode 131 is formed, excluding the light emitting unit 132 on the p-contact layer 128, and an n-side electrode is formed on a lower surface of the n-GaAs substrate 121.

In the second embodiment, the mesa formed by dry etching becomes each VCSEL. To arrange the sources of luminescence of the light source 14b, a photo mask is formed along the arrangement of the sources of luminescence, an etching mask is then formed by a normal photolithographic process, and etching is performed. It is preferred that the slot of 4 micrometers to 5 micrometers or larger is provided between the devices for electrical and spatial separation of respective devices in the array. It is because if the slot is too narrow, etching control becomes difficult. The mesa shape can be an arbitrary shape such as oval, square, rectangular other than circular in the second embodiment. It is preferred that the size (diameter and the like) of the mesa is about 10 micrometers or larger. It is because if the size is too small, heat is accumulated at the time of operation of the device, thereby deteriorating the characteristic.

Figure 25:
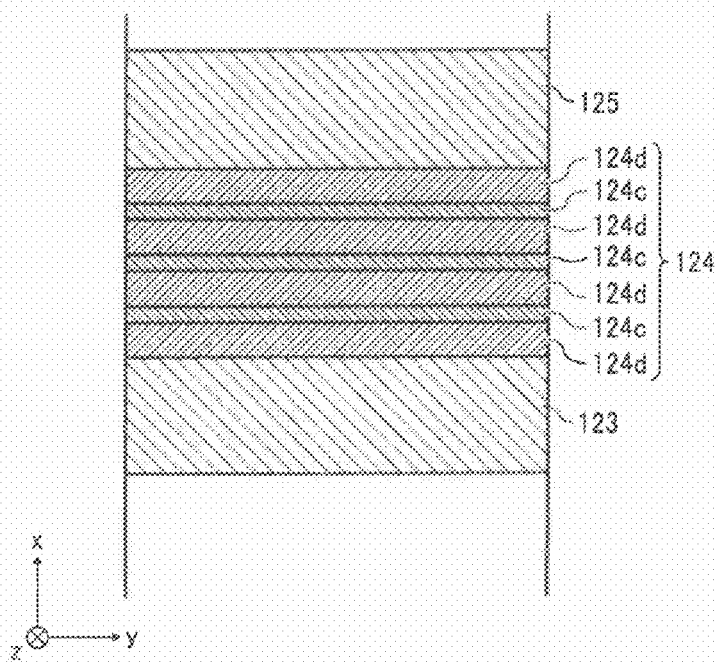
FIG. 25 is an enlarged view of another example of an active layer of the VCSEL.

Such 780 nm-band VCSEL can be made of another material. FIG. 25 is an enlarged view around the active layer 124 made of another material. The active layer 124 includes three GaInPAs quantum well active layers 124c having a compressive strain composition and a bandgap wavelength of 780 nanometers, and four $Ga_{0.6}In_{0.4}P$ barrier layers 124d having a tensile strain, which lattice-match with the quantum well active layers 124c, and an $(Al_{0.7}Ga_{0.3})_{0.5}In_{0.5}P$, which is a wide bandgap, is used as cladding layers 123 and 125 (spacer layers in the second embodiment) for carrier confinement. In this case, the bandgap difference between the cladding layers and the quantum well active layer can be made quite large, as compared with a case that the cladding layers for carrier confinement are made of AlGaAs.

FIG. 14 depicts bandgap difference between the spacer layer and the quantum well layer and between the barrier layer and the quantum well layer of the AlGaAs/AlGaAs (spacer layer/quantum well layer) 780-nm and 850-nm VCSELs and the AlGaInP/GaInPAs (spacer layer/quantum well layer) 780-nm VCSEL. The spacer layer stands for a layer between the active layer and the reflecting mirror in the general configuration, and has a function as the cladding layer for confining the carriers.

As shown in FIG. 14, with the AlGaInP/GaInPAs (spacer layer/quantum well layer) 780-nm VCSEL, the bandgap difference can be made larger than that of the AlGaAs/AlGaAs 780-nm VCSEL and the AlGaInP/GaInPAs 850-nm VCSEL. Specifically, the bandgap difference between the cladding layer and the active layer is as large as 767 meV, as compared with 466 meV (when the cladding layer is made of AlGaAs (Al composition is 0.6). The bandgap difference between the barrier layer and the active layer is also large, which enables excellent carrier confinement.

Further, because the active layer has the compressive strain, a gain increase becomes large due to a band separation between a heavy hole and a light hole, thereby enabling high gain, and therefore high output with a low threshold. This effect cannot be obtained by the 780-nm or 850-nm VCSEL made of AlGaAs system, having substantially the same lattice constant as the GaAs substrate. Further, the threshold can be set low by improving the carrier confinement and achieving high gain by the strain quantum-well active layer, thereby enabling to decrease the reflectivity of a distributed Bragg reflector (DBR) on the light extracting side, and obtain high output.

The active layer and the barrier layer are made of a material not containing Al, to form an Al-free active region (the quantum well active layer and the adjacent layer thereto). Therefore, oxygen uptake to the active layer can be reduced, and formation of the non-radiative recombination center can be suppressed, thereby enabling a long life. Accordingly, the write unit or the light source unit can be reused.

Referring back to FIG. 21, the coupling lens 15 has a focal length of 47.7 millimeters, and substantially collimates the light beams emitted from the light source 14b.

The aperture plate (aperture member) 23 has a rectangular or oval aperture having a size in the Y-axis direction (main scanning direction) of 5.44 millimeters, and a size in the Z-axis direction (sub-scanning direction) of 2.10 millimeters. The aperture is arranged so that the center of the aperture is positioned at the focal position or near the focal position of the coupling lens 15.

The cylindrical lens (imaging lens) 17 has a focal length of 107.0 millimeters and a refracting power in the Z-axis direction (sub-scanning direction). The cylindrical lens 17 images the light beams transmitted through the aperture plate (aperture member) 23 in the sub-scanning direction, near the deflection-reflecting surface of the polygon mirror 13b via the reflecting mirror 18.

The polygon mirror 13b is a member having a shape of a regular polygonal column, which is a regular dodecagon, whose upper face touches internally with a circle having a radius of 7 millimeters. The deflector surfaces that deflect the incident light beams are formed on the sides of a dodecahedron of the polygon mirror 13b, and rotated by a rotation mechanism (not shown) at a constant angular velocity around a rotation axis parallel to the Z-axis direction. Accordingly, the light beams incident to the polygon mirror 13b are scanned in the Y-axis direction.

The deflector-side scanning lens (first scanning lens) 11a and the image-surface side scanning lens (second scanning lens) 11b are, for example, resin scanning lenses having a thickness of 13.5 millimeters and 3.5 millimeters, respectively, at the center (on the optical axis).

In the optical scanning device 1010B, sub-scanning lateral magnification as the whole optical scanning device 1010B is 2.18 times, and the sub-scanning lateral magnification of the optical system (scanning optical system) after the polygon mirror 13b is 0.97 times. The focal length of the scanning optical system in the main scanning direction is 237.8 millimeters, and the focal length thereof in the sub-scanning direction is 71.4 millimeters. A width of a writing area of the photosensitive drum 1030 is in a range of ±105.0 millimeters in the main scanning direction (Y-axis direction), centering on a point O shown in FIG. 21. The point O is a point where a straight line parallel to the X axis passing through the rotation center of the polygon mirror 13b and the surface to be scanned of the photosensitive drum 1030 cross each other in FIG. 21. The spot diameter of the light beams on the surface of the photosensitive drum 1030 is desirably 52 micrometers in the main scanning direction and 55 micrometers in the sub-scanning direction. As shown in FIG. 21, optical distances d1, d2, d3, d4, d5, d6, d7, and d8 between the light source 14b and the optical devices, and sizes D1, D2, D3, and D4 of the respective devices in the optical axis direction are as shown in Tables 1 and 2 as one example.

TABLE 1

Unit: mm

| d1 | d2 | d3 | d4 | d5 | d6 | d7 | d8 |
|---|---|---|---|---|---|---|---|
| 46.06 | 10.32 | 56.5 | 40.0 | 13.0 | 46.31 | 89.73 | 141.36 |

TABLE 2

Unit: mm

| D1 | D2 | D3 | D4 |
|---|---|---|---|
| 3.0 | 3.0 | 13.50 | 3.50 |

Figure 26A:
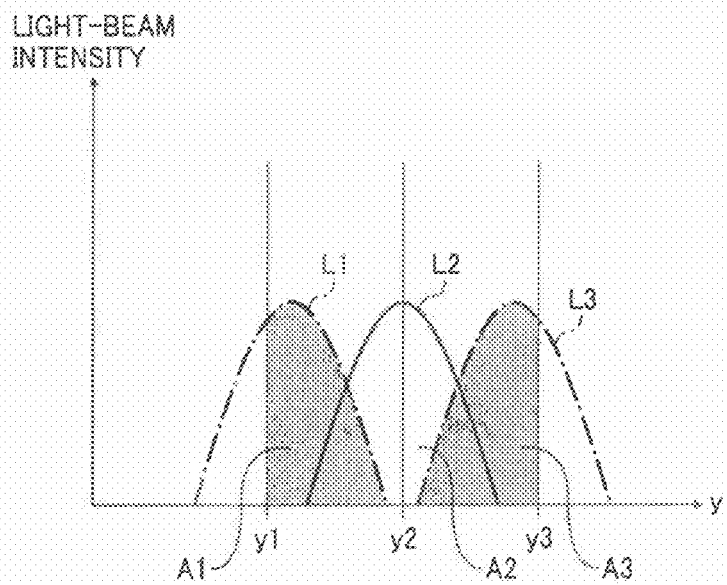
FIGS. 26A and 26B are schematic diagrams for explaining a method for equalizing the quantity of light beams incident to a deflector surface.

FIG. 26A depicts the intensity of the light beams emitted from a $VCSEL_{13}$ positioned at the center of the first row, and a $VCSEL_{11}$ and a $VCSEL_{15}$ positioned at the opposite ends in the main scanning direction of the first row, among the VCSELs in the light source 14b, and incident to a surface parallel to the deflector surface of the polygon mirror 13b (hereinafter, "plane of incidence"). A position coordinate in the main scanning direction on the plane of incidence is plotted on the horizontal axis in FIG. 26A is, and the intensity of the light beams is plotted on the vertical axis, where y2 is a position coordinate at the center in the main scanning direction on the deflector surface of the polygon mirror 13b, and y1 and y3 are position coordinates at the opposite ends in the main scanning direction on the deflector surface. The light beams emitted from the $VCSEL_{11}$, $VCSEL_{13}$, and $VCSEL_{15}$ are referred to as light beams $LB_{11}$, $LB_{13}$, and $LB_{15}$, respectively.

When scanning near the center point O in the writing area of the photosensitive drum 1030 is performed by the light beams $LB_{11}$, $LB_{13}$, and $LB_{15}$ having equal intensity, because the light beams $LB_{11}$, $LB_{13}$, and $LB_{15}$ are deflected by the deflector surface substantially parallel to a ZY plane, intensity distributions in the planes of incidence of the respective light beams $LB_{11}$, $LB_{13}$, and $LB_{15}$ are indicated by curved lines L1, L2, and L3 in FIG. 26A. Because only part of two light beams $LB_{11}$ and $LB_{15}$ of the three light beams $LB_{11}$, $LB_{13}$, and $LB_{15}$ is incident to the deflector surface, the quantities of light after being reflected by the deflector surface are proportional to areas of regions A1 and A3 (hatched region in FIG. 26A) specified by the curved line L1 or L3, a straight line passing through the position y1 or y2 and perpendicular to the Y axis, and the Y axis. On the other hand, as for the light beams $LB_{13}$, because all the light beams $LB_{13}$ are incident to the deflector surface, the quantity of light after being reflected by the deflector surface is proportional to an area of a region A2 specified by the curved line L2 and the Y axis. That is, the ratio of the quantity of light beams $LB_{11}$, $LB_{13}$, and $LB_{15}$ reflected by the deflector surface is equal to the area ratio of regions A1, A2, and A3, and increases toward the light beams incident to the center of the deflector surface, and decreases toward the light beams incident to the vicinity of an edge at the opposite ends of the deflector surface in the main scanning direction.

Figure 26B:
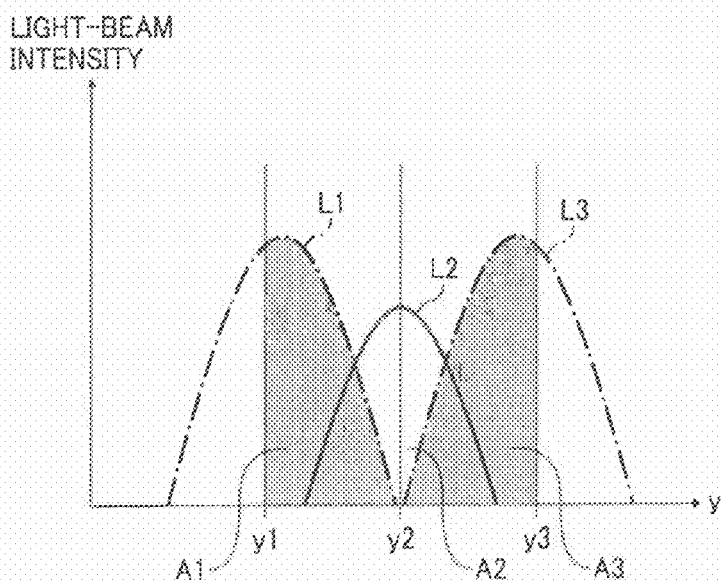

Accordingly, in the optical scanning device 1010B according to the second embodiment, when scanning near the center point O in the writing area of the photosensitive drum 1030 is performed, the $VCSEL_{11}$, $VCSEL_{13}$, and $VCSEL_{15}$ are driven so that the intensity of the two light beams $LB_{11}$ and $LB_{15}$ is stronger than that of the light beam $LB_{13}$. For example, as shown in FIG. 26B, the $VCSEL_{11}$, $VCSEL_{n}$, and $VCSEL_{n}$ are driven so that peak values of the two curved lines L1 and L2 is larger than a peak value of the curved line L2, and the area of the regions A1, A2, and A3 is substantially equal to each other. Accordingly, the quantities of light of the three light beams $LB_{11}$, $LB_{13}$, and $LB_{15}$ reflected by the deflector surface become equal to each other.

The $VCSEL_{12}$ and $VCSEL_{14}$ arranged on the first row in the light source 14b are also controlled so that the intensity of light beams to be emitted therefrom becomes stronger than that of the light beam $LB_{13}$, and the quantities of light beams reflected by the deflector surface become equal to the quantity of light of the light beam $LB_{13}$, L reflected by the deflector surface. The $VCSEL_{21}$ to $VCSEL_{85}$ arranged on the second to the eighth rows are also controlled in the same manner as in the VCSEL on the first row, so that the intensity of the light beams to be emitted from the VCSELs arranged at the opposite ends in the main scanning direction becomes stronger than the intensity of the light beam to be emitted from the $VCSEL_{m3}$ arranged at the center in the main scanning direction. Accordingly, the quantities of light beams emitted from the VCSELs of the light source 14b and deflected by the deflector surface of the polygon mirror 13b become substantially equal to each other.

The light beams deflected by the deflector surface of the rotating polygon mirror 13b are focused on the surface of the photosensitive drum 1030, in a state with a moving speed in the main scanning direction of the light beam spot being adjusted by the deflector-side scanning lens (the first scanning lens) 11a and the image-surface side scanning lens (the second scanning lens) 11b.

On the other hand, the surface of the photosensitive drum 1030 is charged with a predetermined voltage by the charger 1031, and therefore charges are distributed with a certain charge density. When the photosensitive drum 1030 is scanned by the light beams deflected by the polygon mirror 13b, carriers (charges) are generated in a photosensitive layer to which the light beams are incident, and in this portion, charge transfer occurs and the potential decreases. Therefore, because the photosensitive drum 1030 rotating in a direction of arrow in FIG. 1 is scanned by the light beams modulated based on image information, an electrostatic latent image regulated by the charge distribution is formed on the surface thereof. Thereafter, a developing process, paper feed and transport, a transfer process, and a fixing process are performed.

In the optical scanning device 1010B according to the second embodiment, because the quantities of light beams deflected by the deflector surface become substantially uniform, the scanning of the writing area on the photosensitive drum 1030 is performed by the light beams having the same quantity of light. Accordingly, the whole area of the writing area can be uniformly scanned.

As shown in FIG. 22, for example, the 40 VCSELs in the light source 10 are two-dimensionally arranged on the surface parallel to the ZY plane so that the distance (=148.8 μm) between the VCSELs farthest apart from each other in the sub-scanning direction (Z-axis direction) is larger than the distance (=95.6 μm) between the light emitting units farthest apart from each other in the main scanning direction (Y-axis direction). Accordingly, non-uniform distribution of the quantity of light of the light beams deflected by the deflector surface of the polygon mirror 13b can be avoided, and the surface to be scanned can be scanned highly accurately.

Figure 27A:
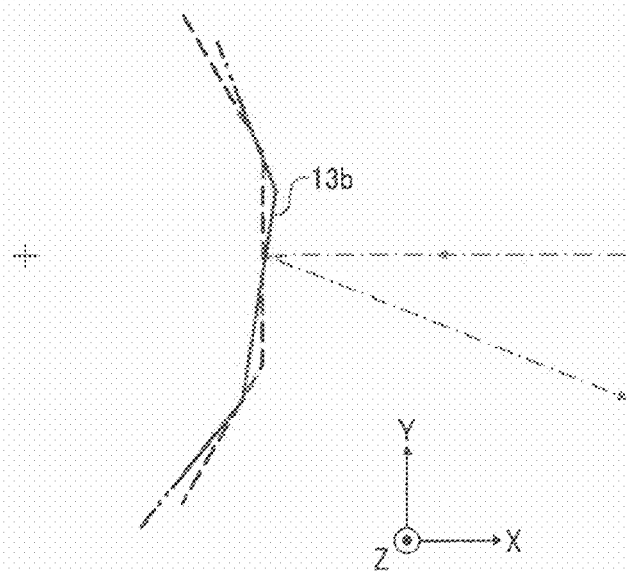
FIGS. 27A and 27B are schematic diagrams for explaining a position on the deflector surface where a light beam is incident.
Figure 28A:
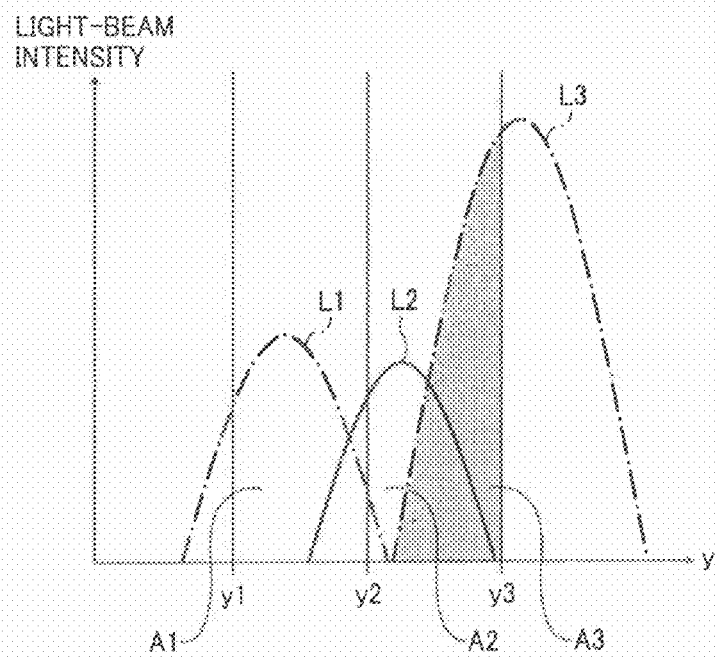
FIGS. 28A and 28B are schematic diagrams for explaining the method for equalizing the quantity of light beams incident to a deflector surface.

In the optical scanning device 1010B according to the second embodiment, when the writing area on the −Y side than the central part of the writing area (near the center point O) of the photosensitive drum 1030 is scanned, for example, as shown in FIG. 27A, the incident position of the light beams on the deflector surface moves to the +Y direction. Accordingly, the quantity of light of the light beams, which is not incident to the deflector surface, increases on the +Y side. In this case, the intensity of the light beams to be incident to the vicinity of the +Y side edge on the deflector surface is increased than that of the light beam L2, like the light beam L3 as shown in FIG. 28A, to drive the VCSELs in the light source 14b so that the areas of the regions A3 and A2 become substantially the same. Accordingly, the light beams having uniform quantity of light can scan from the central part of the writing area to the −Y side writing area.

Figure 27B:
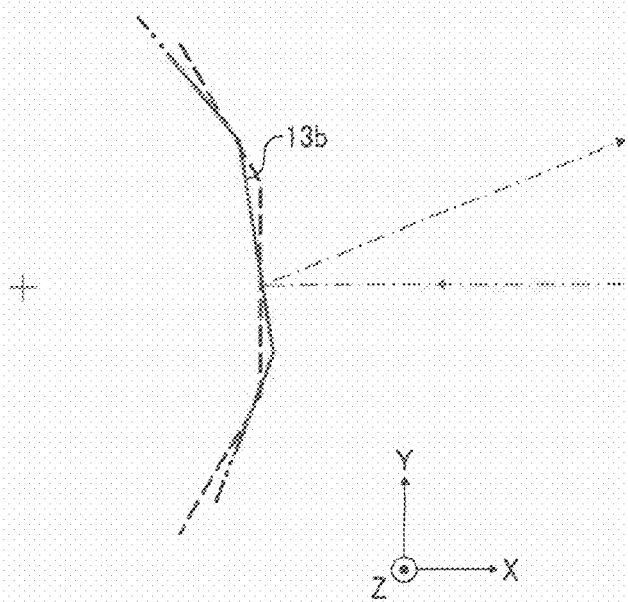
Figure 28B:
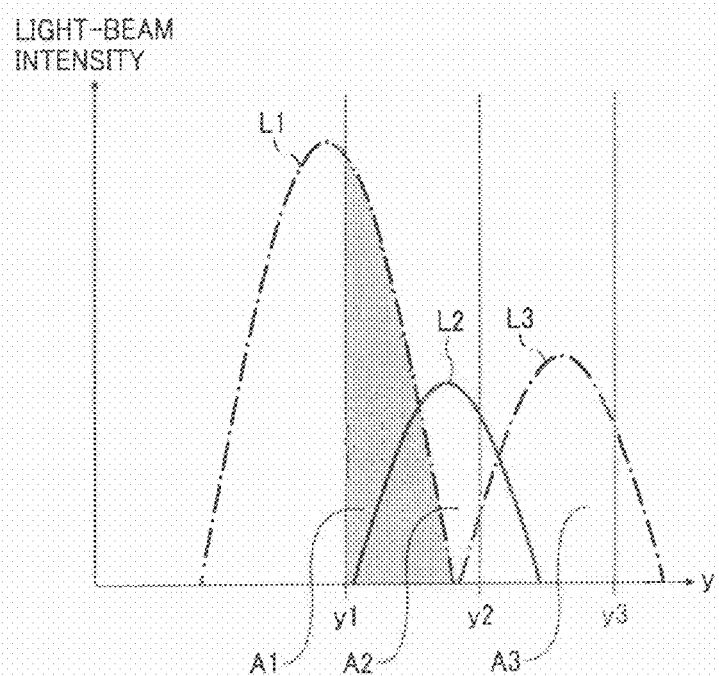

When the writing area on the +Y side than the central part of the writing area (near the center point O) is scanned, as shown in FIG. 27B, the incident position of the light beams on the deflector surface moves to the −Y direction. Accordingly, the quantity of light of the light beams, which is not incident to the deflector surface, increases on the −Y direction. In this case, the intensity of the light beams to be incident to the vicinity of the −Y side edge on the deflector surface is increased than that of the light beam L1 as shown in FIG. 28B, to drive the VCSELs in the light source 14b so that the areas of the regions A1 and A2 become substantially the same. Accordingly, the light beams having uniform quantity of light can scan from the central part of the writing area to the −Y side writing area.

Figure 29:
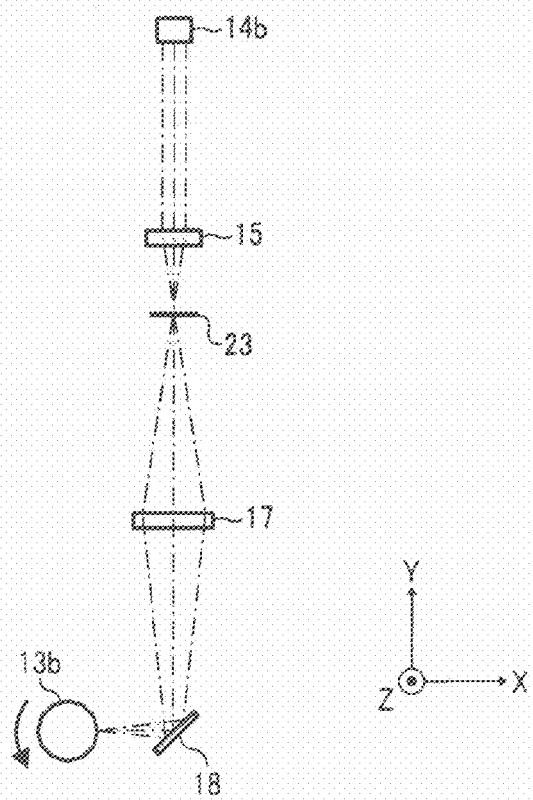
FIG. 29 is a schematic diagram for explaining an effect obtained by a line-image forming lens having a refracting power in a main scanning direction.
Figure 30:
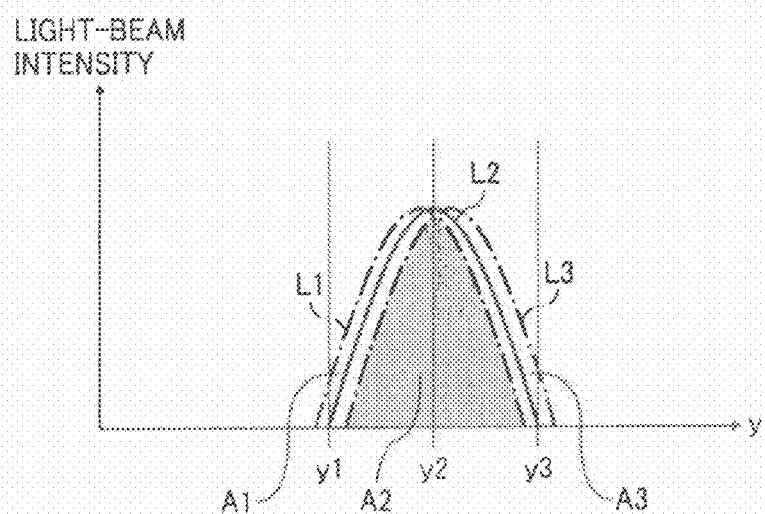
FIG. 30 is a schematic diagram for explaining another effect obtained by the line-image forming lens having a refracting power in the main scanning direction.

The spots of light beams can be superimposed on the deflector surface of the polygon mirror 13b by an anamorphic lens having a refracting power in the main scanning direction for the cylindrical lens (imaging lens) 17. When the anamorphic lens having, for example, the focal length in the sub-scanning direction of 107.0 millimeters and the focal length in the main scanning direction of 54 millimeters is used for the cylindrical lens (imaging lens) 17 in the optical system shown in FIG. 21, as shown in FIG. 29, the light beams emitted from the light source 14b is focused near a certain point on the deflector surface formed on the polygon mirror 13b. In this case, because the curved lines indicating intensity distribution of light beams are substantially superimposed on each other, as shown in FIG. 30, a plurality of light beams having the uniform intensity is emitted from the light source 14b, thereby enabling to scan the writing area on the photosensitive drum 1030 by the light beams having the uniform quantity of light.

Figure 31:
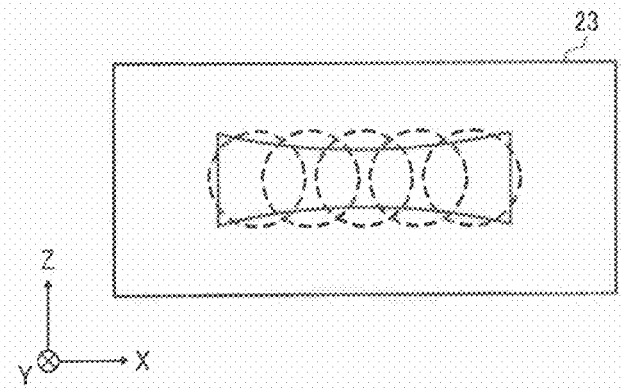
FIG. 31 is a schematic diagram of a modification of an aperture of an aperture plate shown in FIG. 2.

In the second embodiment, the aperture plate 23 has a rectangular or oval aperture with a size of 5.44 millimeters in the Y-axis direction (main scanning direction), and 2.10 millimeters in the Z-axis direction (sub-scanning direction). However, the aperture plate 23 can be arranged at a position slightly shifted in the Y-axis direction from the focal point of the coupling lens 15, and, as shown in FIG. 31, the aperture can have a shape such that the size in the sub-scanning direction increases from the center to the opposite ends in the main scanning direction. Accordingly, the quantity of light of the light beams incident to the vicinity of the edges at the opposite ends of the polygon mirror 13b in the main scanning direction can be increased than that of the light beams incident to the center of the deflector surface in the main scanning direction. As a result, the quantity of light of the light beams reflected by the deflector surface can be made uniform.

With the image forming apparatus 1000 according to the second embodiment including the optical scanning device 1010B, an image is obtained from a latent image formed on the photosensitive drum 201 with light beams having the uniform quantity of light. Accordingly, an image can be formed on a sheet highly accurately.

In the second embodiment, the optical scanning device 1010B is explained as being applied to the monochrome image forming apparatus 1000; however, it can be applied to a tandem color image forming apparatus, such as a color copier, capable of forming a full-color image and including a plurality of photosensitive drums.

Figure 33:
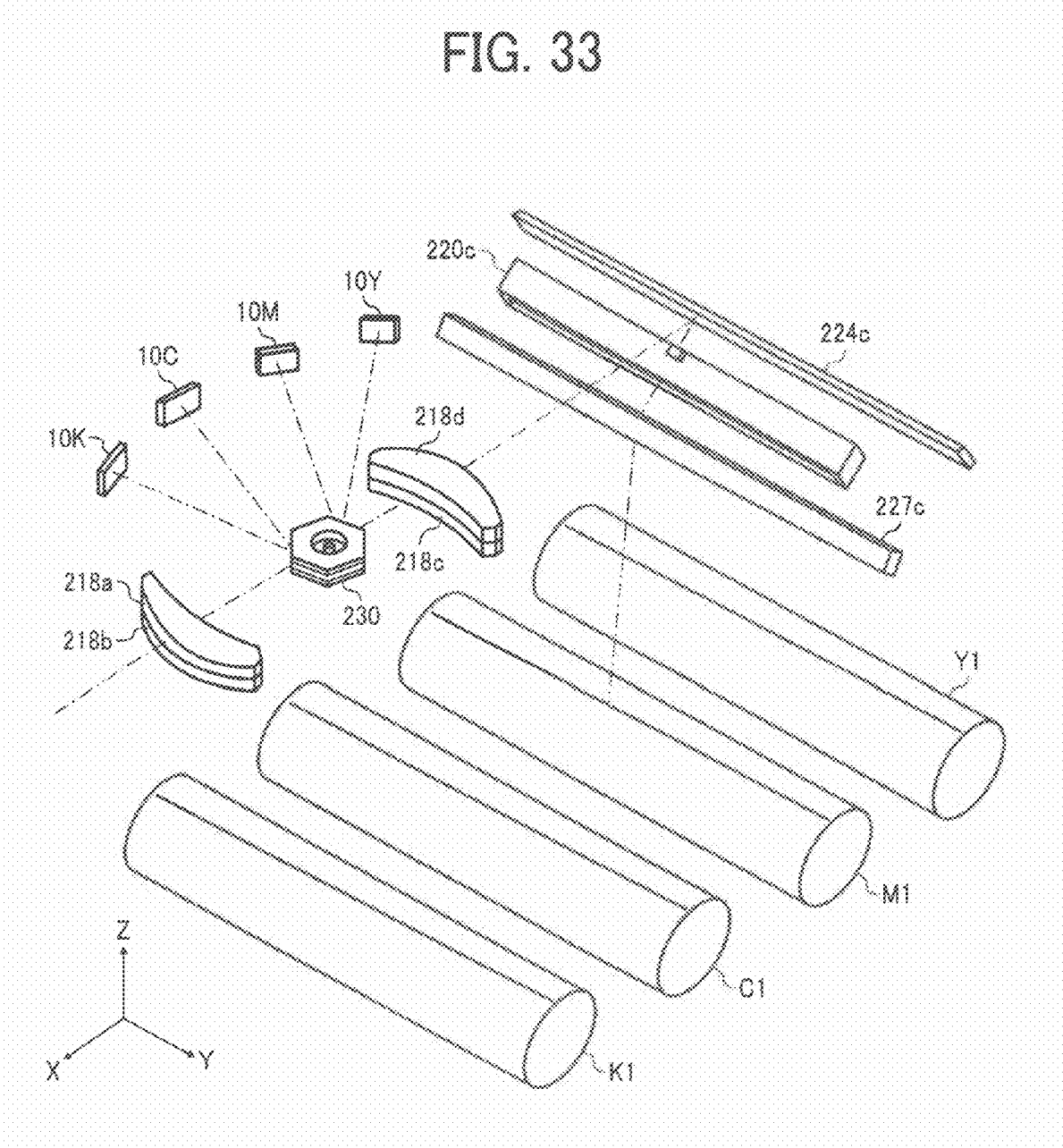
FIG. 33 is a perspective view of an optical scanning device shown in FIG. 32.
Figure 34:
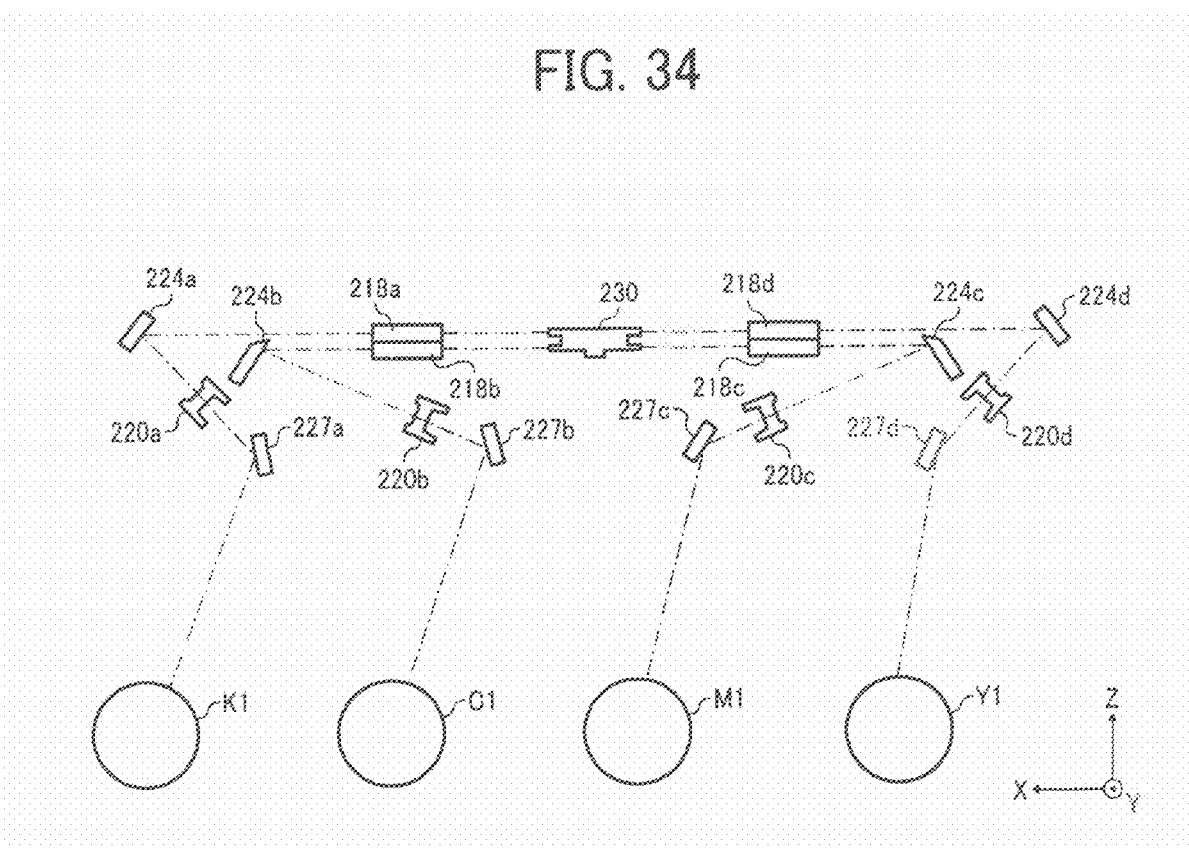
FIG. 34 is a schematic diagram for explaining optical scanning performed by the optical scanning device shown in FIG. 33.

A multicolor-image forming apparatus 300 capable of forming a color image and including a plurality of photosensitive drums is explained with reference to FIGS. 32 to 34. The multicolor-image forming apparatus 300 includes a photosensitive drum K1, a charger K2, a developing unit K4, a cleaning unit K5, and a transfer changer K6 for black; a photosensitive drum C1, a charger C2, a developing unit C4, a cleaning unit C5, and a transfer changer C6 for cyan; a photosensitive drum M1, a charger M2, a developing unit M4, a cleaning unit M5, and a transfer changer M6 for magenta; a photosensitive drum Y1, a charger Y2, a developing unit Y4, a cleaning unit Y5, and a transfer changer Y6 for yellow; an optical scanning device 900; a transfer belt 901; and a fuser 902.

Figure 32:
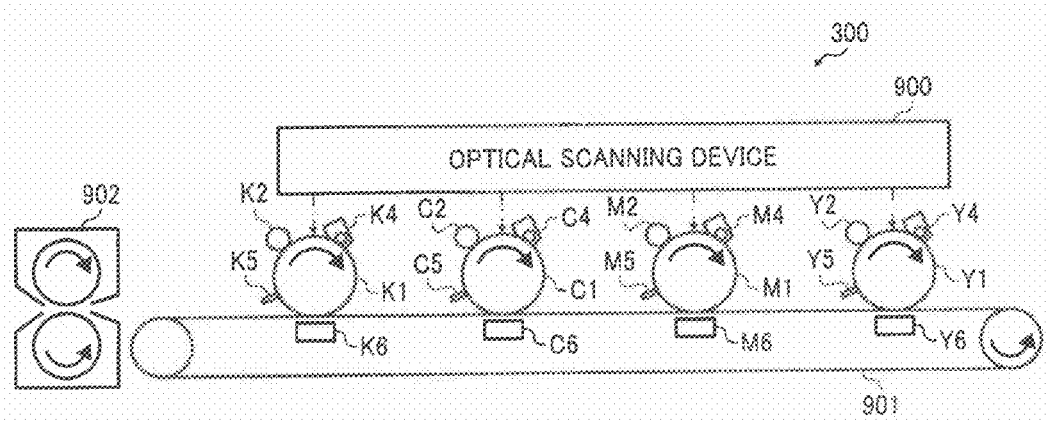
FIG. 32 is a schematic diagram of a multicolor-image forming apparatus.

The photosensitive drums K1, C1, M1, and Y1 rotate in a direction of arrow shown in FIG. 32, and the charger (K2, C2, M2, and Y2), the developing unit (K4, C4, M4, and Y4), the transfer charger (K6, C6, M6, and Y6), and the cleaning unit (K5, C5, M5, and Y5) are arranged in an order of rotation. The chargers K2, C2, M2, and Y2 uniformly charge the surface of the corresponding photosensitive drums K1, C1, M1, and Y1. The optical scanning device 900 irradiates the photosensitive drums K1, C1, M1, and Y1 charged by the charger K2, C2, M2, and Y2 with light, thereby forming an electrostatic latent image on the surface of each of the photosensitive drums K1, C1, M1, and Y1. The electrostatic latent image is developed into a toner image by corresponding one of the developing units K4, C4, M4, and Y4. The toner images of respective colors are superimposed to form a full-color image, and transferred onto a sheet by the transfer chargers K6, C6, M6, and Y6. The full-color image is fixed on the sheet by the fuser 902.

The optical scanning device 900 is explained next with reference to FIGS. 33 and 34.

The optical scanning device 900 includes light source units 10K, 10C, 10M, and 10Y, an optical system (not shown) that includes a coupling lens 11 and an aperture member 12 as in the optical scanning device 1010, and guides the light beams emitted from the light source units 10K, 10C, 10M, and 10Y to a polygon mirror 230, the polygon mirror 230, first scanning lenses 218a, 218b, 218c, and 218d, folding mirrors 224a, 224b, 224c, 224d, 227a, 227b, 227c, and 227d, and second scanning lenses 220a, 220b, 220c, and 220d. Only part of the optical scanning device 900 is shown in FIGS. 14 and 15 for convenience.

The light source units 10K, 10C, 10M, and 10Y include the light source 10.

The light source unit 10K emits laser beams (hereinafter, "black beams") modulated corresponding to black image information. The light source unit 10C emits laser beams (hereinafter, "cyan beams") modulated corresponding to cyan image information. The light source unit 10M emits laser beams (hereinafter, "magenta beams") modulated corresponding to magenta image information. The light source unit 10Y emits laser beams (hereinafter, "yellow beams") modulated corresponding to yellow image information.

The first scanning lens 218a, the folding mirror 224a, the second scanning lens 220a, and the folding mirror 227a correspond to the black beams.

The first scanning lens 218b, the folding mirror 224b, the second scanning lens 220b, and the folding mirror 227b correspond to the cyan beams.

The first scanning lens 218c, the folding mirror 224c, the second scanning lens 220c, and the folding mirror 227c correspond to the magenta beams.

The first scanning lens 218d, the folding mirror 224d, the second scanning lens 220d, and the folding mirror 227d correspond to the yellow beams.

The laser beams emitted from the light source units are converged in the sub-scanning direction so that the laser beams become linear on the deflector surface of the polygon mirror 230. A deflection point on the polygon mirror 230 and a focused point on the surface of the corresponding photosensitive drum become conjugate in the sub-scanning direction.

The polygon mirror 230 includes a six-sided mirror having a two-stage structure. The black beams from the light source unit 10K and the yellow beams from the light source unit 10Y are deflected by the six-sided mirror on a first stage, and cyan beams from the light source unit 10C and the magenta beams from the light source unit 10M are deflected by the six-sided mirror on a second stage. That is, all the laser beams are deflected by the single polygon mirror 230.

The first scanning lenses 218a and 218b are arranged on one side (+X side) of the polygon mirror 230, and the first scanning lenses 218c and 218d are arranged on the other side (−X side) of the polygon mirror 230. The first scanning lenses 218a and 218b, and the first scanning lenses 218c and 218d are laminated in a direction corresponding to the sub-scanning direction (Z-axis direction).

The black beams from the first scanning lens 218a is imaged in a spot on the photosensitive drum K1 via the folding mirror 224a, the first scanning lens 220a, and the folding mirror 227a.

The cyan beams from the first scanning lens 218b is imaged in a spot on the photosensitive drum C1 via the folding mirror 224b, the first scanning lens 220b, and the folding mirror 227b.

The magenta beams from the first scanning lens 218c is imaged in a spot on the photosensitive drum M1 via the folding mirror 224c, the first scanning lens 220c, and the folding mirror 227c.

The yellow beams from the first scanning lens 218d is imaged in a spot on the photosensitive drum Y1 via the folding mirror 224d, the first scanning lens 220d, and the folding mirror 227d.

The folding mirrors are arranged so that the optical path lengths from the polygon mirror 230 to the respective photosensitive drums match each other and the incident position and the incident angle of the laser beams on the respective photosensitive drums are equal to each other.

In the multicolor-image forming apparatus 300, a line image is formed on the photosensitive drums K1, C1, M1, and Y1 by the light beams, with the quantity of light being uniformly adjusted. Accordingly, a highly detailed multicolor image can be accurately formed on the recording medium.

In the above embodiments, the optical scanning device is explained as being applied to a printer; however, it can also be applied to other types of image forming apparatuses such as copiers and facsimile machines, and multifunction products that combine any or all of the functions of these.

As set forth hereinabove, according to an embodiment of the present invention, it can be prevented that the light emitted from the light source and reflected by the deflection-reflecting surface returns to the light source side, and therefore the quantity of light emitted from the light source can be monitored accurately. Further, the sub-scanning beam pitch deviation due to grazing incidence can be reduced. As a result, the surface to be scanned can be stably scanned by the beams.

Moreover, non-uniform distribution of the quantity of light of a plurality of light beams deflected by the deflector surface (deflector surface of the overfilled optical system) having a deflector surface smaller than the beam width of the light beams in the main scanning direction can be avoided, and the surface to be scanned can be scanned highly accurately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source that includes a plurality of light emitting units for emitting light beams;
   a deflector that includes a deflecting surface for deflecting the light beams from the light source;
   a scanning optical system that focuses the light beams deflected by the deflector on a surface to be scanned; and
   a monitoring optical system that monitors a quantity of light beams emitted from the light source, wherein
   the light emitting units are arranged two-dimensionally, and a distance between two light emitting units at opposite ends in a main scanning direction is smaller than a distance between two light emitting units at opposite ends in a sub-scanning direction,
   the size of the deflecting surface in the main scanning direction is smaller than a width of a light flux of light beams in the main scanning direction, and
   upon scanning around a center of a writing area with light beams, intensities of the light beams increase from a light beam at a center in the main scanning direction toward at least one of a light beam at a write-start position and a light beam at a write-end position.

2. The optical scanning device according to claim 1, wherein
   the light emitting units are arranged so that a distance between light emitting units farthest apart from each other in the sub-scanning direction is larger than a distance between light emitting units farthest apart from each other in the main scanning direction.

3. The optical scanning device according to claim 1, further comprising:
   a coupling lens that couples light beams to be incident to the deflector, and
   an aperture member that includes an aperture through which the light beams coupled by the coupling lens pass, wherein
   the aperture member is arranged so that the aperture is positioned near a focal position of the coupling lens, and
   a width of the aperture in the sub-scanning direction increases from center toward periphery in the main scanning direction.

4. The optical scanning device according to claim 1, further comprising:
- a coupling lens that couples light beams to be incident to the deflector; and
- an optical element that focuses the light beams coupled by the coupling lens on the deflecting surface of the deflector in the sub-scanning direction, wherein
- the optical element has a positive power in the sub-scanning direction, and is located closer to the deflector than a focal position of the coupling lens.

5. The optical scanning device according to claim 1, wherein
- the light beams enter the deflector from a direction inclined with respect to a normal direction of the deflecting surface at least in a sub-scanning direction.

6. The optical scanning device according to claim 1, further comprising:
- a rectangular or oval shaped aperture member.

7. An optical scanning device comprising:
- a light source that includes a plurality of light emitting units for emitting light beams;
- a deflector that includes a deflecting surface for deflecting the light beams from the light source;
- a scanning optical system that focuses the light beams deflected by the deflector on a surface to be scanned; and
- a monitoring optical system that monitors a quantity of light beams emitted from the light source, wherein
- the light emitting units are arranged two-dimensionally, and a distance between two light emitting units at opposite ends in a main scanning direction is smaller than a distance between two light emitting units at opposite ends in a sub-scanning direction,
- the size of the deflecting surface in the main scanning direction is smaller than a width of a light flux of light beams in the main scanning direction,
- upon scanning from a write-start position to a center of a writing area with light beams, intensities of the light beams incident to the writing area increase from a light beam at the center in the main scanning direction toward a light beam at a write-end position, and
- upon scanning from the center to the write-end position of the writing area with light beams, intensities of the light beams incident to the writing area increase from a light beam at the center in the main scanning direction toward a light beam at the write-start position.

* * * * *